(12) United States Patent
Ikuma et al.

(10) Patent No.: US 8,754,973 B2
(45) Date of Patent: Jun. 17, 2014

(54) SOLID-STATE IMAGING DEVICE, METHOD FOR DRIVING THE SAME WHERE A LOW-PASS FILTER IS INSERTED IN COLUMN SIGNAL LINE TO IMPROVE READING SPEED AND REDUCE NOISE

(75) Inventors: Makoto Ikuma, Kyoto (JP); Yutaka Abe, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/591,989

(22) Filed: Aug. 22, 2012

(65) Prior Publication Data

US 2012/0320246 A1    Dec. 20, 2012

Related U.S. Application Data

(63) Continuation of application No. PCT/JP2010/005478, filed on Sep. 7, 2010.

(30) Foreign Application Priority Data

Feb. 26, 2010 (JP) ................... 2010-042273

(51) Int. Cl.
 *H04N 3/14* (2006.01)
(52) U.S. Cl.
 USPC .......................................................... 348/300
(58) Field of Classification Search
 USPC .......................................... 348/300–302, 308
 See application file for complete search history.

(56) References Cited

U.S. PATENT DOCUMENTS

| | | | |
|---|---|---|---|
| 7,129,883 B2 | 10/2006 | Muramatsu et al. | |
| 7,315,273 B2 | 1/2008 | Muramatsu et al. | |
| 7,375,672 B2 | 5/2008 | Muramatsu et al. | |
| 7,538,709 B2 | 5/2009 | Muramatsu et al. | |
| 7,612,815 B2 | 11/2009 | Suzuki et al. | |
| 7,817,188 B2 * | 10/2010 | Bleau et al. | 348/211.11 |
| 2005/0206548 A1 | 9/2005 | Muramatsu et al. | |
| 2006/0097902 A1 | 5/2006 | Muramatsu et al. | |

(Continued)

FOREIGN PATENT DOCUMENTS

| | | |
|---|---|---|
| JP | 2002-051264 A | 2/2002 |
| JP | 2004-112077 A | 4/2004 |

(Continued)

OTHER PUBLICATIONS

International Search Report issued in International Application No. PCT/JP2010/005478 issued on Oct. 5, 2010.

*Primary Examiner* — Tuan Ho
*Assistant Examiner* — Shahbaz Nazrul
(74) *Attorney, Agent, or Firm* — McDermott Will & Emery LLP

(57) ABSTRACT

A solid-state imaging device includes unit pixels arranged in rows and columns, and reads a pixel signal from the unit pixels selected for each of the rows. The device includes: column signal lines provided for the columns of the unit pixels; amplifying transistors included in the unit pixels and each outputting the pixel signal; correlated double sampling units provided for the columns of the unit pixels and each performing correlated double sampling on a reset component of the pixel signal and on a data component including the reset component and a signal component of the pixel signal so as to sample the signal component; and low-pass filters each (i) inserted in the column signal line between an output terminal of the amplifying transistor and the correlated double sampling unit or (ii) included in the correlated double sampling unit.

18 Claims, 20 Drawing Sheets

(56) References Cited

U.S. PATENT DOCUMENTS

| | | |
|---|---|---|
| 2006/0227229 A1 | 10/2006 | Suzuki et al. |
| 2007/0030187 A1 | 2/2007 | Muramatsu et al. |
| 2008/0231491 A1 | 9/2008 | Muramatsu et al. |
| 2008/0239124 A1* | 10/2008 | Mori et al. .................. 348/308 |
| 2010/0194948 A1 | 8/2010 | Murakami et al. |
| 2012/0320243 A1* | 12/2012 | Hagihara .................... 348/294 |
| 2013/0002916 A1* | 1/2013 | Itano ........................... 348/302 |
| 2013/0120622 A1* | 5/2013 | Hiraoka et al. .............. 348/294 |

FOREIGN PATENT DOCUMENTS

| | | |
|---|---|---|
| JP | 2004-200792 A | 7/2004 |
| JP | 2005-323331 A | 11/2005 |
| JP | 2008-252605 A | 10/2008 |
| JP | 2009-010787 A | 1/2009 |

* cited by examiner

CN11, 12: Not connected

ADINx
To input terminal of column AD circuit

10 Pixel array
3 Unit pixel
14 Vertical scanning circuit
53 Column amplifier
54 Clamping circuit
55 Sample/hold circuit
56 Multiplexer (MUX)
57 Column selecting circuit
58 Output amplifier
59 A/D conversion circuit

US 8,754,973 B2

SOLID-STATE IMAGING DEVICE, METHOD FOR DRIVING THE SAME WHERE A LOW-PASS FILTER IS INSERTED IN COLUMN SIGNAL LINE TO IMPROVE READING SPEED AND REDUCE NOISE

CROSS REFERENCE TO RELATED APPLICATIONS

This is a continuation application of PCT Patent Application No. PCT/JP2010/005478 filed on Sep. 7, 2010, designating the United States of America, which is based on and claims priority of Japanese Patent Application No. 2010-042273 filed on Feb. 26, 2010. The entire disclosures of the above-identified applications, including the specifications, drawings and claims are incorporated herein by reference in their entirety.

TECHNICAL FIELD

The present invention relates to a solid-state imaging device, a method for driving the same, and a camera.

BACKGROUND ART

Cell sizes of photoelectric conversion elements in solid-state imaging devices have been reduced, and mainly high-resolution solid-state imaging devices having more than ten million pixels have been introduced on the market.

In order to realize such solid-state imaging devices, various methods for reading a signal of a MOS image sensor have been proposed (for example, PTL 1 and PTL 2).

In other words, the technique of sampling a pixel signal by performing correlated double sampling (hereinafter, referred to as "CDS") on a digital signal including (i) a reset component obtained by digital conversion by an AD conversion unit provided for each column and (ii) a data component (=the reset component+a signal component) has been disclosed for the conventional solid-state imaging devices so as to reduce noise and accelerate the response.

CITATION LIST

Patent Literature

[PTL 1] Japanese Unexamined Patent Application Publication No. 2005-323331
[PTL 2] Japanese Unexamined Patent Application Publication No. 2009-10787

SUMMARY OF INVENTION

Technical Problem

Since the solid-state imaging devices have been downsized according to the progress in the high-resolution, the signal component (S: Signal) is reduced. Thus, it is necessary to reduce (improve) the noise component (N: Noise) in order to maintain the signal-to-noise performance.

The conventional AD conversion circuit of the column-parallel-output type disclosed in PTL 1 includes a low-pass filter including (i) an amplifying transistor included in each pixel and having an output resistance Rs and (ii) a vertical signal line having a parasitic capacitance, and has a cutoff frequency fc of approximately several MHz to several tens of MHz. In the digital CDS performed by the AD conversion circuit, only a DC signal with the reset component and the data component (=the reset component+the signal component) of pixels is a necessary component. Thus, the digital CDS has been performed in a bandwidth more than necessary in view of the noise characteristics.

In other words, since the conventional AD conversion circuit has a wider bandwidth to cope with the accelerating speed, it has a problem of extracting an unnecessary high-frequency noise component and a problem with inferior noise characteristics.

In contrast, a conventional AD conversion circuit of the column-parallel-output type disclosed in PTL 2 additionally includes a sample-and-hold capacitor for holding charges. Although the low-pass filter included in the AD conversion circuit includes (i) an amplifying transistor included in each pixel and having an output resistance Rs and (ii) the sample-and-hold capacitor, the AD conversion circuit has a problem with insufficient noise characteristics.

When a low-pass filter with an anti-aliasing function is applied to the AD conversion circuit to improve the noise characteristics, generally, there is a problem that the response speed of a pixel signal decreases because of the narrowed bandwidth. Assuming that a low-pass filter simply includes a resistor and a capacitor (RC), the response time $\tau=RC$ is delayed as the cutoff frequency $fc=1/(2\pi RC)$ decreases.

Furthermore, with inclusion of an active filter using an operational amplifier that is generally often used, new problems occur: degradation of noise with increase in the number of elements; increase in the chip area; and the difficulty in compatibility between the fast reading operation and the noise characteristics that are features of the column-parallel-output-type solid-state imaging devices having the limitation in pitch for the column area.

The first object of the present invention is to provide a solid-state imaging device including a CDS unit provided for each column for improving the noise characteristics, a method for driving the device, and a camera.

The second object of the present invention is to provide a solid-state imaging device including a CDS unit provided for each column for maintaining a balance between the fast reading operation and improving of the noise characteristics, a method for driving the device, and a camera.

Solution to Problem

A solid-state imaging device that achieves the first object includes a plurality of unit pixels arranged in rows and columns and reads a pixel signal from the unit pixels selected for each of the rows, the solid-state imaging device including: column signal lines each provided for a corresponding one of the columns of the unit pixels; amplifying transistors each included in a corresponding one of the unit pixels and outputting the pixel signal; correlated double sampling units each provided for a corresponding one of the columns of the unit pixels and configured to perform correlated double sampling on a reset component of the pixel signal and on a data component including the reset component and a signal component of the pixel signal so as to sample the signal component; and low-pass filters each (i) inserted in a corresponding one of the column signal lines between an output terminal of the amplifying transistor and the correlated double sampling unit or (ii) included in a corresponding one of the correlated double sampling units.

With the configuration, the noise characteristics can be improved with the low-pass filters.

Here, each of the unit pixels may include: a photodiode that converts light into signal charges; a floating diffusion layer that holds the signal charges; a reset transistor that resets the signal charges held by the floating diffusion layer; a transfer transistor that transfers the signal charges from the photodiode to the floating diffusion layer; and the amplifying transistor that outputs the pixel signal according to the signal charges held by the floating diffusion layer, wherein each of the low-pass filters may be switchable between first filter characteristics and second filter characteristics, the second filter characteristics including (i) a low-frequency cutoff higher than a low-frequency cutoff of the first filter characteristics and (ii) a transient response speed faster than a transient response speed of the first filter characteristics, and the low-pass filter may be operated with the second filter characteristics during a period in which the pixel signal output from the amplifying transistor varies, and is operated with the first filter characteristics during a period in which the pixel signal is stable.

With the configuration, the second object can be achieved. In other words, since the solid-state imaging device is operated with the second filtering characteristics including a higher low-frequency cutoff (that is, wider bandwidth) and a faster transient response speed, during the period in which the pixel signal varies.

Here, the low-pass filter may include: a resistor inserted in the column signal line; and a capacitor connected between a ground line and a terminal of the resistor, the terminal being closer to the correlated double sampling unit.

With the configuration, when the low-pass filter simply includes a resistor and a capacitor, the noise characteristics in capturing an image in particular with low illumination by, for example, an infrared camera that features the sensitivity rather than the high speed response can be improved.

Here, the low-pass filter may further include a first switch connected in parallel with the resistor.

With the configuration, the switch can easily control switching between the first filter characteristics and the second filter characteristics.

Here, the low-pass filter may further include a first p-n junction element connected in parallel with the resistor, and a second p-n junction element connected in parallel with the resistor opposite in polarity to the first p-n junction element.

The configuration can maintain a balance between the fast reading operation and improving of the noise characteristics while suppressing increase in the chip area.

Here, the low-pass filter may further include an operational transconductance amplifier having a positive input terminal, a negative input terminal, and an output terminal, the positive input terminal being connected to the other terminal of the resistor that is closer to the amplifying transistor, and the negative input terminal and the output terminal being connected to the terminal of the resistor that is closer to the correlated double sampling unit.

The configuration eliminates the need for providing a control signal for switching between the first filter characteristics and the second filter characteristics and lines for supplying the control signal, thus suppressing increase in the area.

Here, each of the low-pass filters may include: a resistor inserted in a corresponding one of the column signal lines; and a capacitor connected between the column signal line and a ground line, the solid-state imaging device further includes signal holding units each provided for the column signal line and configured to sample and hold an analog signal output from the column signal line, each of the signal holding units may include a second switch inserted in the column signal line between the resistor and the correlated double sampling unit, the capacitor may be connected between the column signal line and the ground line, the column signal line being located between the second switch and the correlated double sampling unit, and the capacitor may function as a part of the low-pass filter with the second switch ON before the correlated double sampling unit performs the correlated double sampling, and function as a part of the signal holding unit with the second switch OFF during the time when the correlated double sampling unit performs the correlated double sampling.

Here, the low-pass filter may further include a first switch connected in parallel with the resistor.

Here, the low-pass filter may further include a first switch having (i) a terminal connected to the column signal line of the resistor that is closer to the amplifying transistor, and (ii) the other terminal connected to the column signal line of the second switch that is closer to the correlated double sampling unit.

The configuration allows sharing the capacitor between the low-pass filter and the signal holding unit, and suppressing increase in the area.

Here, the first switch may be ON during the period in which the pixel signal output from the amplifying transistor varies, and may be OFF during the period in which the pixel signal is stable.

Here, the first switch may be ON during a first period including a period during which the reset transistor performs a reset operation, and may be turned OFF after the first period, and the first switch may be ON during a second period including a period during which the transfer transistor performs a transfer operation, and may be turned OFF after the second period.

Here, the solid-state imaging device may further include a reference signal generating unit configured to generate a reference signal having a ramp waveform, wherein each of the correlated double sampling units may include: a voltage comparator provided for a corresponding one of the columns; and a counter that counts a clock signal, the voltage comparator may include: a differential input unit including two transistors that receive the reference signal, and the pixel signal output from the amplifying transistor; and a load capacitor connected between output terminals of the differential input unit, the voltage comparator may convert the pixel signal into a duration by comparing the pixel signal with the reference signal, the counter converts the duration into a digital signal, and the two transistors and the load capacitor function as the low-pass filter.

The configuration allows sharing the capacitor between the low-pass filter and the voltage comparator included in the correlated double sampling unit, and suppressing increase in the area.

Here, a cutoff frequency of the low-pass filter may be lower than half a frequency for reading the reset component and the data component on both of which the correlated double sampling is performed.

Here, a cutoff frequency of the first filter characteristics may be lower than half a frequency for reading the reset component and the data component on both of which the correlated double sampling is performed.

Since the noise spectrum is shifted to the low frequency side even when the transient response speed remains low, the effect of removing noise can be increased with this configuration.

Here, a cutoff frequency of the first filter characteristics may be lower than 1/1000 times of a clock frequency of the correlated double sampling unit, and a signal having the clock frequency may be attenuated by 60 dB or more by switching from the second filter characteristics to the first filter characteristics.

Here, since the clock noise after applying a low-pass filter is attenuated by 60 dB, the noise tolerance can be increased for the digital noise.

Here, the resistor may include a MOS transistor.

Here, the operational transconductance amplifier may include a MOS transistor.

Furthermore, the camera that achieves the first object includes the solid-state imaging device.

A method for driving a solid-state imaging device that achieves the second object is a method for driving a solid-state imaging device that includes a plurality of unit pixels arranged in rows and columns and reads a pixel signal from the unit pixels selected for each of the rows, the solid-state imaging device including: column signal lines each provided for a corresponding one of the columns of the unit pixels; amplifying transistors each included in a corresponding one of the unit pixels and outputting the pixel signal; correlated double sampling units each provided for a corresponding one of the columns of the unit pixels and configured to perform correlated double sampling on a reset component of the pixel signal and on a data component including the reset component and a signal component of the pixel signal so as to sample the signal component; and low-pass filters each (i) inserted in a corresponding one of the column signal lines between an output terminal of the amplifying transistor and the correlated double sampling unit or (ii) included in a corresponding one of the correlated double sampling units, each of the low-pass filters being switchable between first filter characteristics and second filter characteristics, the second filter characteristics including (i) a low-frequency cutoff higher than a low-frequency cutoff of the first filter characteristics and (ii) a transient response speed faster than a transient response speed of the first filter characteristics, and the driving method including: operating each of the low-pass filters with the second filter characteristics during a period in which the pixel signal output from the amplifying transistor varies; and operating each of the low-pass filters with the first filter characteristics during a period in which the pixel signal is stable.

Advantageous Effects of Invention

The solid-state imaging device according to the present invention has an advantage of maintaining a balance between the fast reading operation and improving of the noise characteristics.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings.

Description of Embodiments

Embodiment 1

A solid-state imaging device according to Embodiment 1 is a solid-state imaging device that includes a plurality of unit pixels arranged in rows and columns and reads a pixel signal from the unit pixels selected for each of the rows, the solid-state imaging device includes: column signal lines each provided for a corresponding one of the columns of the unit pixels; amplifying transistors each included in a corresponding one of the unit pixels and outputting the pixel signal; correlated double sampling units each provided for a corresponding one of the columns of the unit pixels and configured to perform correlated double sampling on a reset component of the pixel signal and on a data component including the reset component and a signal component of the pixel signal so as to sample the signal component; and low-pass filters each (i) inserted in a corresponding one of the column signal lines between an output terminal of the amplifying transistor and the correlated double sampling unit or (ii) included in a corresponding one of the correlated double sampling units.

The noise characteristics are improved with the low-pass filter.

Figure 1:
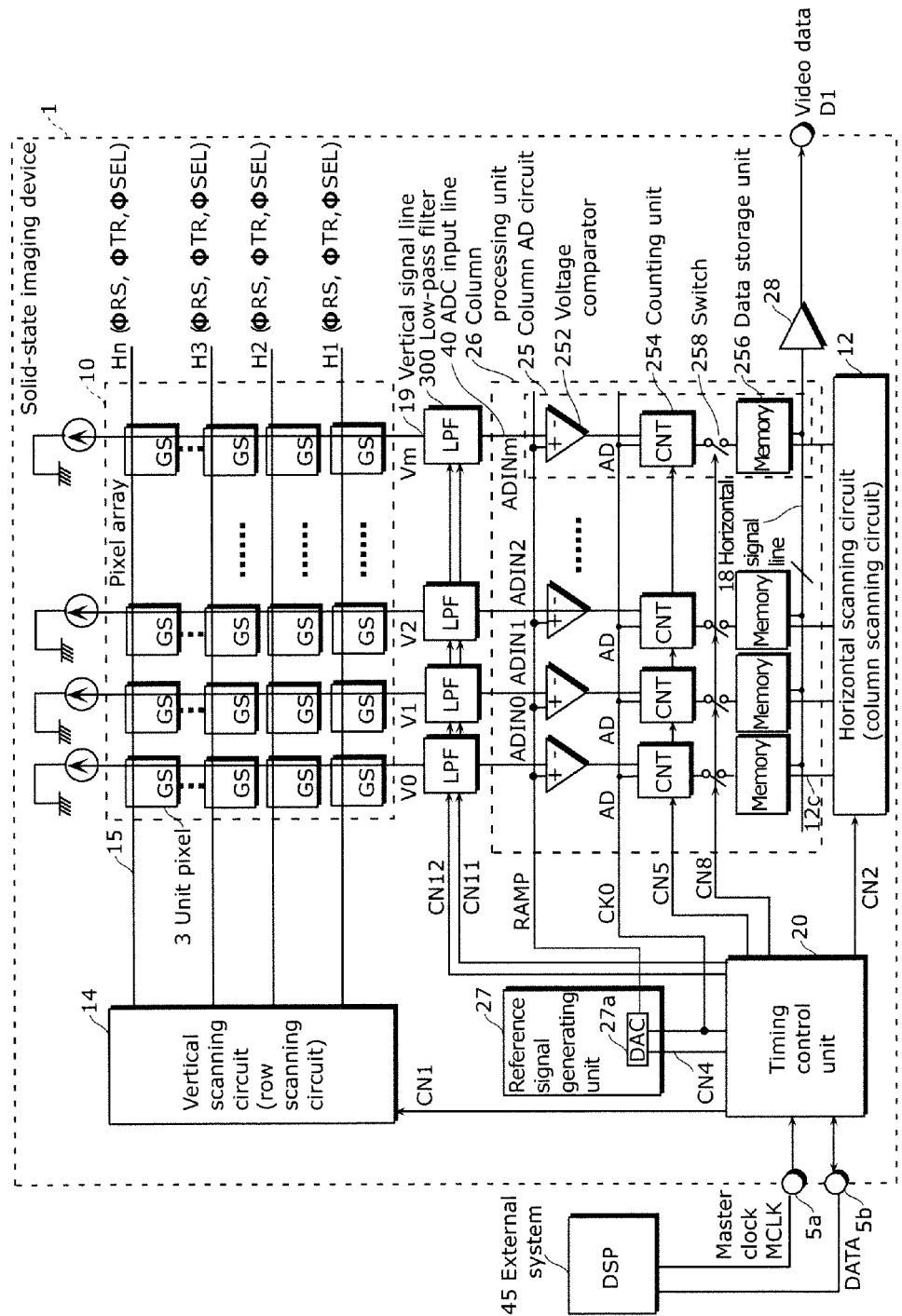
FIG. 1 illustrates an example of a circuit configuration of a solid-state imaging device according to Embodiments 1 to 7.

Hereinafter, a solid-state imaging device and a method for driving the same according to Embodiment 1 will be described with reference to drawings. FIG. 1 illustrates a structural plan view of an image capturing apparatus (camera) and a solid-state imaging device according to Embodiment 1.

In FIG. 1, the image capturing apparatus includes a solid-state imaging device 1 including: a pixel array 10 in which a plurality of unit pixels 3 are arranged in rows and columns; low-pass filters 300; a column processing unit 26; a reference signal generating unit 27 including a Digital Analog Converter (DAC) 27a that supplies a reference voltage RAMP to each column AD circuit 25 included in the column processing unit 26; and an output circuit 28.

The image capturing apparatus further includes: a horizontal scanning circuit (also referred to as "column scanning circuit") 12 that controls a column address and column scanning; a vertical scanning circuit (also referred to as "row scanning circuit") 14 that controls a row address and row scanning; and a timing control unit 20 that receives a master clock MCLK through a terminal 5a, generates various internal clocks, and controls, for example, the horizontal scanning circuit 12 and the vertical scanning circuit 14.

Furthermore, each of the unit pixels 3 is connected to a horizontal signal line (also referred to as "row control line") 15 controlled by the vertical scanning circuit 14, and to a vertical signal line (also referred to as "column signal line") 19 through which a pixel signal is transmitted to the column processing unit 26.

Furthermore, each of the column AD circuits 25 receives the pixel signal from the unit pixel 3 through the vertical signal line 19 (V1, V2, ..., Vn), the low-pass filter 300, and an ADC input line 40 (ADIN0, ADIN1, ..., ADINm) for each of the horizontal signal lines 15 (H0, H1, ..., Hm). Each of the column AD circuits 25 includes: a voltage comparator 252 that compares the analog pixel signal with the reference voltage RAMP generated by the reference signal generating unit 27; a counting unit (counter) 254 the counts a clock signal until the voltage comparator 252 finishes the comparing; and a data storage unit 256 functioning as a memory that holds a result of the counting. Furthermore, each of the column AD circuits 25 has an n-bit AD conversion function.

Furthermore, the input terminal (+) of the voltage comparator 252 receives the reference voltage RAMP having a ramp waveform and generated by the reference signal generating unit 27, as in the input terminals (+) of the other voltage comparators 252. The other input terminal (−) of the voltage comparator 252 is connected to the ADC input line 40 (ADIN0, ADIN1, ..., ADINm) that is an output line of the low-pass filter 300 of a corresponding vertical column, and receives a pixel signal voltage from the pixel array 10. The voltage comparator 252 supplies an output signal to a corresponding one of the counting units 254.

Furthermore, each of the column AD circuits 25 starts to count a clock signal upon supply of the reference voltage RAMP to a corresponding one of the voltage comparators 252, and performs AD conversion by comparing the reference voltage RAMP with the analog pixel signal fed through the ADC input line 40 and counting the clock signal until a pulse signal is obtained.

As well as the AD conversion, each of the column AD circuits 25 performs processing on the pixel signal of the analog voltage fed through the ADC input line 40 to calculate a difference between a reset component Vrst (including noise) immediately after resetting the pixel and a data component including an actual signal component (reset component Vrst+signal component Vsig), according to an amount of light received. In other words, the column AD circuit 25 functions as a CDS unit. Accordingly, the column AD circuit 25 can eliminate variations causing an error, such as clock skew and counter delay, from each of the columns, and extract only the actual signal level Vsig. In other words, the digital CDS can be performed.

FIG. 1 illustrates a configuration with which a down-count operation is performed on the reset component Vrst (including noise) and an up-count operation is performed on the data component (reset component Vrst+signal component Vsig) to extract only the actual signal component Vsig. The pixel data digitalized by each of the column AD circuits 25 is transmitted to the horizontal signal line 18 through a horizontal selection switch that is not illustrated and is driven by a horizontal selection signal from the horizontal scanning circuit 12, and further to the output circuit 28.

With the configuration, in the solid-state imaging device 1 according to Embodiment 1, the pixel signal of each column is successively output for each row from the pixel array 10 in which light-receiving elements as charge generating units are arranged in the rows and the columns (matrix). Then, an image corresponding to the pixel array 10, that is, a frame image is represented by a collection of the pixel signals of the entire pixel array 10.

As described above, the solid-state imaging device 1 according to Embodiment 1 is characterized by including the low-pass filters 300 between the vertical signal lines 19 and the voltage comparators 252. More specifically, the low-pass filters 300 are inserted in the ADC input lines 40 between the vertical signal lines 19 and the input terminals of the voltage comparators 252.

Each of the unit pixels 3 in FIG. 1 may have a one-pixel one-cell structure including a pixel, a transfer transistor, an FD, a reset transistor, and an amplifying transistor, or a multiple-pixel one-cell structure including pixels and either (i) one of an FD, a reset transistor, and an amplifying transistor, or (ii) an FD, a reset transistor, and an amplifying transistor to be shared within the unit cell.

Furthermore, the pixels may have a structure of being formed on the same surface of a semiconductor substrate, that is, on the same surface on which a gate terminal and a line of a transistor are formed, and a structure of a back-illuminated imaging sensor (solid-state imaging device) in which the pixels are formed on a back side of the semiconductor substrate, that is, opposite to the surface on which the gate terminal and the line of the transistor are formed.

Figure 2A:
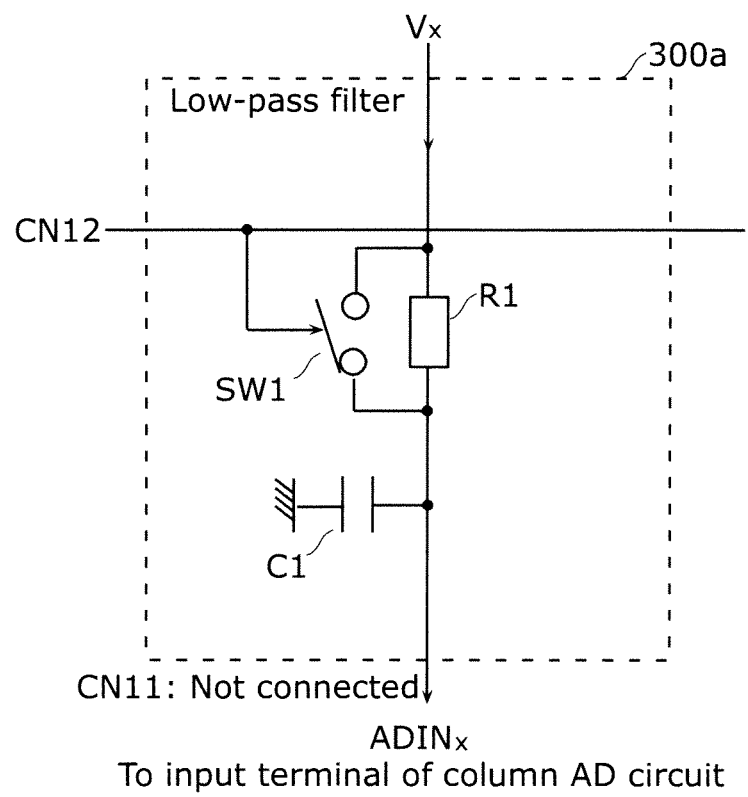
FIG. 2A illustrates an example of a circuit configuration of a low-pass filter 300a according to Embodiment 1.
Figure 2B:
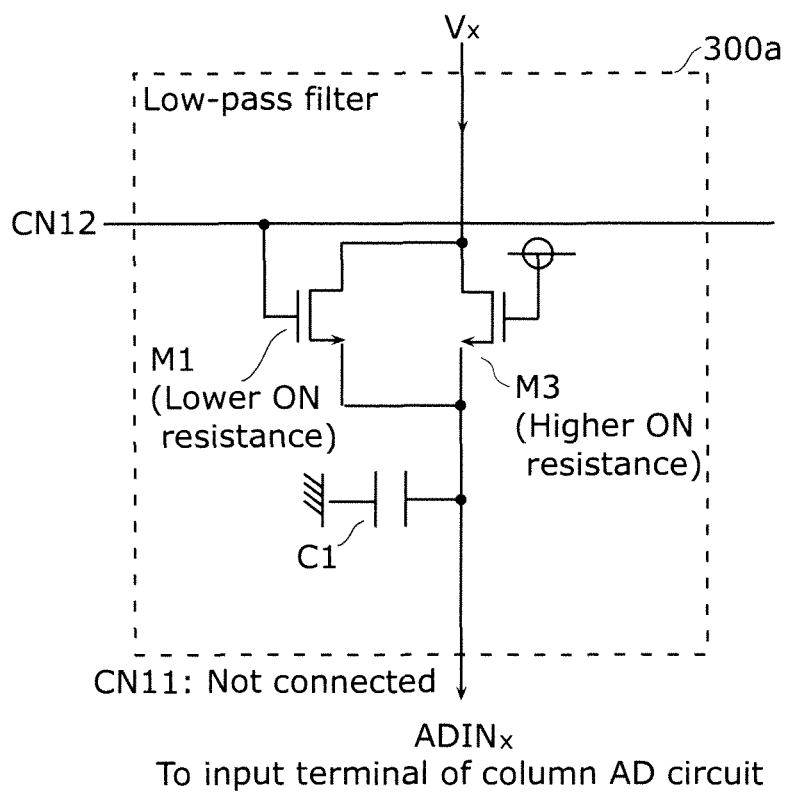
FIG. 2B illustrates an example of a circuit configuration of the low-pass filter 300a according to Embodiment 1.

Next, FIGS. 2A and 2B illustrate examples of a circuit configuration of a low-pass filter 300a according to Embodiment 1.

In the example of FIG. 2A, the low-pass filter 300a includes a switch SW1, a resistor R1 inserted in the ADC input line 40 between an output terminal of a source of an amplifying transistor T12 of the unit pixel 3 and an input terminal (−) of the voltage comparator 252, and a capacitor C1 connected between a ground line and a terminal (−) of the resistor R1 closer to the voltage comparator 252.

For example, the switch SW1 may be a transistor M1 having a lower ON resistance, and the resistor R1 may be a transistor having a higher ON resistance as illustrated in FIG. 2B.

Figure 12:
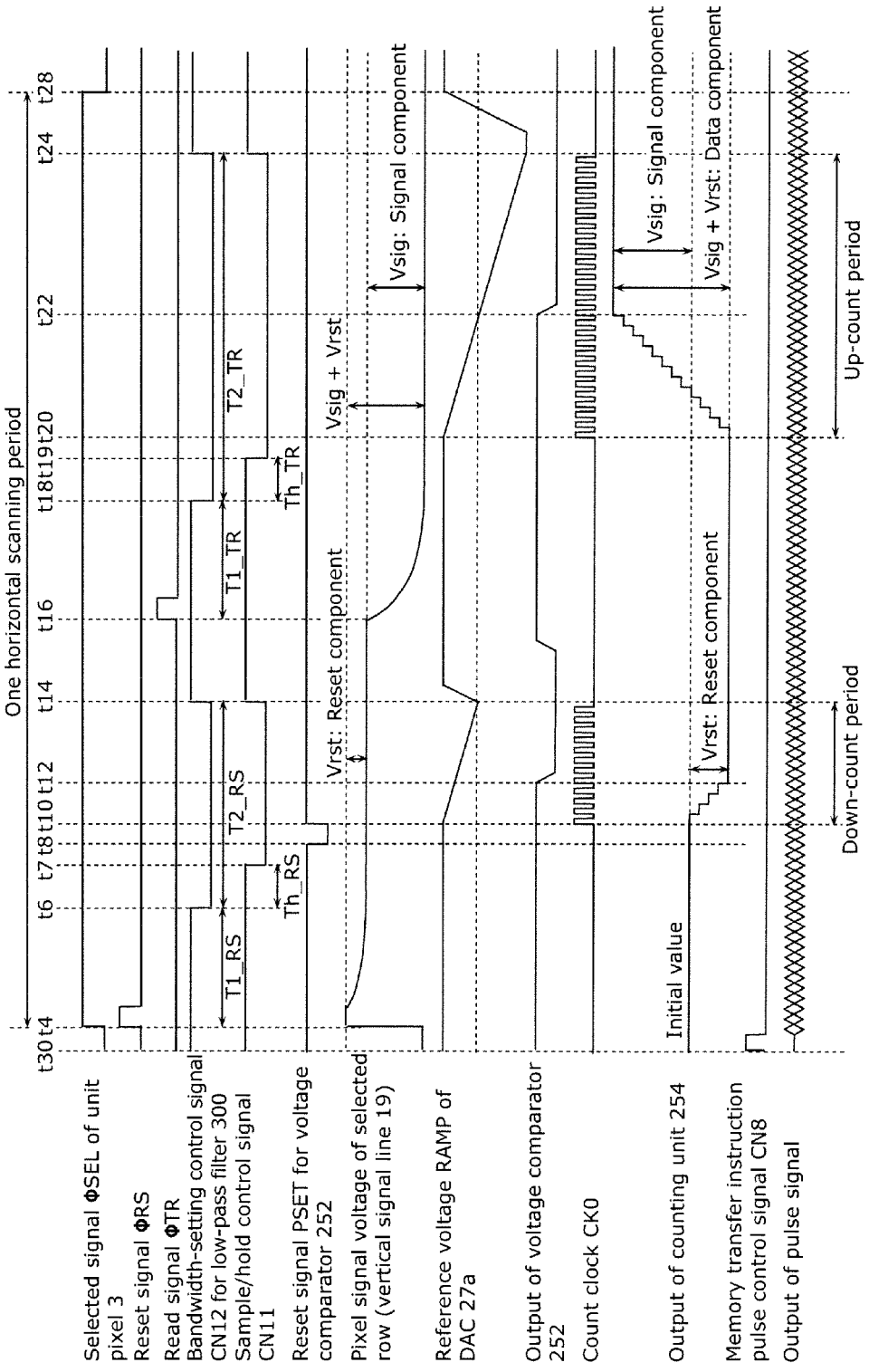
FIG. 12 illustrates a timing chart of the solid-state imaging device during one horizontal scanning period according to Embodiments 1 to 7.

Next, FIG. 12 is a timing chart for describing a method for driving the solid-state imaging device according to Embodiment 1. The control signals added to the prior art include a bandwidth-setting control signal CN12 for controlling a bandwidth of the low-pass filter 300a, and a sample/hold control signal CN11. Here, the sample/hold control signal CN11 is useful for performing sample/hold in Embodiments 5, 6, and 8.

The present invention enables the early stabilization of a pixel signal by accelerating the transient response speed during a period in which the pixel signal varies, and increasing the effect of removing noise by decelerating the transient response speed upon reading the pixel signal by the succeeding circuit during a period in which the pixel signal is stable.

First, the timing control unit 20 resets a count value of each of the counting units 254 to an initial value, and sets the counting units 254 to a down-count mode, for the first read operation. Here, the initial value of the count value may be "0" or any value.

Figure 13:
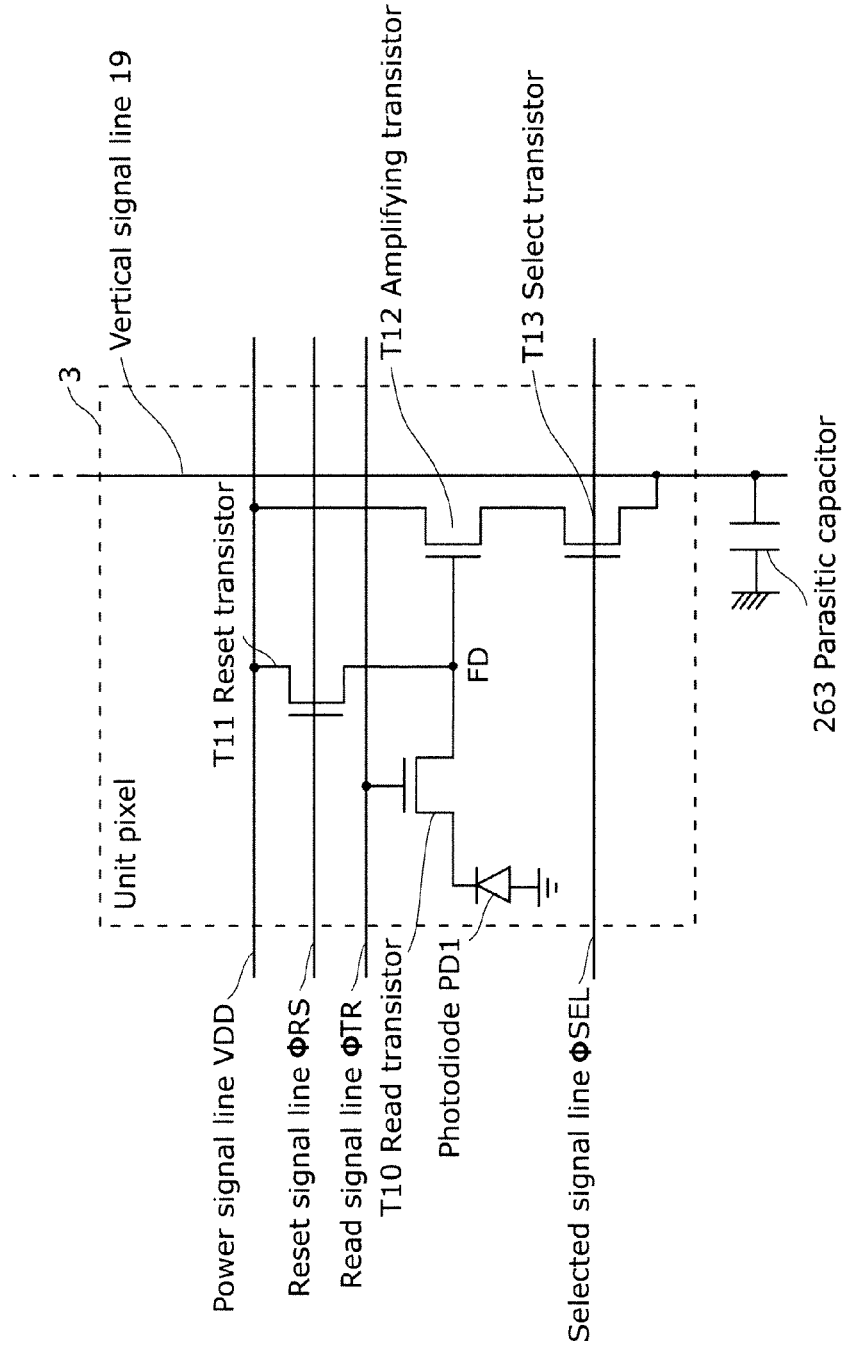
FIG. 13 illustrates an example of a configuration of a unit pixel according to Embodiments 1 to 7.

Next, at a time t4, a selected signal φSEL is set to High level, and a row Hx is selected upon turning on a select transistor T13 of the unit pixel 3 in FIG. 13.

Next, in a state where a read signal φTR is set to Low level and a read transistor (also referred to as transfer transistor) T10 is turned OFF, a reset signal φRS is set to High level, a reset transistor T11 is turned ON, and a voltage of a floating diffusion node FD of the unit pixel 3 is reset.

Next, in a state where the voltage of the floating diffusion node FD is reset after passage of a fixed time, the reset signal φRS is set to Low level, and the reset transistor T11 is turned OFF.

Then, the amplifying transistor T12 amplifies the voltage of the floating diffusion node FD of the unit pixel 3, and the reset component (Vrst) is read through the vertical signal line 19.

Here, the bandwidth-setting control signal CN12 is set to High level during a first period (T1_RS period) in which the output voltage varies by turning ON and OFF the reset signal φRS. Furthermore, the switch SW1 causes a short in the resistor R1 included in the low-pass filter 300a. As a result, the low-pass bandwidth becomes wider, and the transient response speed is accelerated. As such, the switch SW1 is ON during the first period (T1_RS period), and is turned OFF after completion of the first period (time t6). The first period is a period including a period during which the reset transistor T11 and others perform a reset operation, and a period in which the output voltage of the vertical signal line 19 largely varies.

In other words, in FIG. 12, the first period (T1_RS period) is a period in which the pixel signal output from the amplifying transistor T12 to the vertical signal line 19 varies with application of the reset signal φRS to the reset transistor T11.

When the bandwidth-setting control signal CN12 is set to Low level after the sufficient stabilization (time t4+T1_RS period=time t6), the switch SW1 does not cause a short in the resistor R1. As a result, the low-pass bandwidth is narrowed, and the noise characteristics are improved.

Since the noise component in a high frequency domain can be reduced in this state, the down-count operation is performed during a T2_RS period.

During the down-count operation, the timing control unit 20 supplies the control signal CN4 for generating the reference voltage RAMP to the reference signal generating unit 27. Then, the reference signal generating unit 27 receives the reference voltage RAMP having a ramp waveform, as a comparison voltage for the other input terminal (+) of the voltage comparator 252. The voltage comparator 252 compares the reference voltage RAMP, with a voltage of the reset component (Vrst) of the unit pixels output to the ADC input line 40 (ADINx) for each of the columns. Here, the voltage is applied to the capacitor C1 of the low-pass filter 300a.

Furthermore, each of the counting units 254 measures a time period for comparison by a corresponding one of the voltage comparators 252 that are arranged in the rows, simultaneously when the reference voltage RAMP is fed to the input terminal (+) of the voltage comparator 252. In order to do so, the timing control unit 20 supplies a count clock CK0 to a clock terminal of each of the counting units 254 in synchronization with the input of the voltage having the RAMP waveform from the reference signal generating unit 27 (time t10). Thus, the counting units 254 start to count down the count clock CK0 from a set initial value as the first count operation.

Furthermore, each of the voltage comparators 252 compares the reference voltage RAMP from the reference signal generating unit 27, with the voltage (Vrst) of the reset component of the unit pixels of the selected Hx row that is fed through the ADC input line 40. When the voltages match each other, the output level of the voltage comparator 252 is inverted from High level to Low level (t12). In other words, each of the voltage comparators 252 compares the reference voltage RAMP with a voltage corresponding to the reset component Vrst, and counts the count clock CK0 to measure a duration corresponding to a magnitude of the reset component Vrst, thus resulting in obtainment of a count value corresponding to the reset component Vrst. In other words, each of the counting units 254 counts down the count clock CK0 at the beginning of change in the RAMP waveform as the start point of a down-count operation until the output of the voltage comparator 252 is inverted, resulting in obtainment of the count value corresponding to the reset component Vrst.

Furthermore, when a predetermined down-count period passes (t14), the timing control unit 20 suspends supply of (i) control data to the voltage comparators 252 and (ii) the count clock CK0 to the counting units 254. Accordingly, the voltage comparators 252 suspend generation of the reference voltage RAMP having the ramp waveform.

Since the counting units 254 perform the count operation upon detection of the reset component Vrst in the pixel signal voltage of the selected Hx row by the voltage comparators 252, the reset component Vrst of each of the unit pixels 3 are read in the first read operation.

After each of the column AD circuits 25 that are CDS units reads the output signal of the vertical signal line 19 (time t14), the bandwidth-setting control signal CN12 is again set to High level, a wider bandwidth is selected, and the transient response speed is accelerated.

Furthermore, upon completion of the AD conversion of the reset component of the unit pixels, continuously, the second read operation on a pixel signal starts. Furthermore, in the second read operation, the signal component Vsig corresponding to the amount of light incident on each of the unit pixels 3 are read, in addition to the reset component Vrst. The difference with the first read operation is that the counting units 254 are set to an up-count mode.

More specifically, when the read signal φTR is set to High level at the time t16 and the read transistor T10 is turned ON, all the optical charges accumulated in the photodiode PD1 are transferred to the floating diffusion node FD. Then, the read signal φTR is set to Low level, and the read transistor T10 is turned OFF.

Then, the data component (Vrst+Vsig) of the amplifying transistor T12 is read through the vertical signal line 19.

Here, the bandwidth-setting control signal CN12 is set to High level during the first period (T1_TR period) in which the output voltage varies by turning ON the read transistor T10. Furthermore, the switch SW1 causes a short in the resistor R1 included in the low-pass filter 300a. As a result, the low-pass bandwidth becomes wider, and the transient response speed is accelerated. As such, the switch SW1 is ON during the first period (T1_TR period), and is turned OFF after the second period (after T2_TR). The first period (T1_TR period) is a period including a period during which the read transistor T10 performs a transfer operation, and a period in which the output voltage VOUT1 of the vertical signal line 19 varies.

In other words, the first period (T1_TR period) is a period in which the output of the amplifying transistor T12 varies with application of the read signal φTR to the read transistor T10 in the example of FIG. 12.

When the bandwidth-setting control signal CN12 is set to Low level after the sufficient stabilization (time t16+T1_TR period=time t18), the switch SW1 does not cause a short in the resistor R1. As a result, the low-pass bandwidth is narrowed, and the noise characteristics are improved.

Since the noise component in a high frequency domain can be reduced in this state, an up-count operation is performed during a T2_TR period.

In the up-count operation, the reference signal generating unit 27 provides the reference voltage RAMP having a ramp waveform to the voltage comparators 252. Each of the voltage comparators 252 compares the reference voltage RAMP provided through the ADC input line 40 for each of the columns, with the voltage of the signal component of the pixels of the selected Hx row.

Here, the counting unit 254 measures a time period for comparison by the voltage comparator 252, simultaneously when the reference voltage RAMP having the RAMP waveform is provided to the input terminal (+) of the voltage comparator 252. In order to do so, the counting unit 254 starts the up-count operation from the count value at which the down-count operation is suspended, as the second count operation, in synchronization with a ramp waveform voltage supplied from the reference signal generating unit 27 (t20).

Furthermore, the voltage comparator 252 compares the reference voltage RAMP from the reference signal generating unit 27 with the data component (Vrst+Vsig) including the signal component of the pixels of the selected Hx row. The voltage comparator 252 receives the data component through the ADC input line 40 for each of the columns. When the voltages match each other, the output level of the voltage comparator 252 is inverted from High level to Low level (t22).

After each of the column AD circuits 25 reads the output signal of the vertical signal line 19 (time t24), the bandwidth-setting control signal CN12 is again set to High level, a wider bandwidth is selected, and the transient response speed is accelerated.

In other words, each of the voltage comparators 252 compares a voltage signal corresponding to the data component (Vrst+Vsig) with the reference voltage RAMP, and each of the counting units 254 counts the count clock CK0 to measure a duration corresponding to a magnitude of the signal component Vsig, thus resulting in obtainment of a count value corresponding to the signal component Vsig. In other words, the counting unit 254 counts up the count clock CK0 until the output of the voltage comparator 252 is inverted at the beginning of change in the voltage comparator RAMP waveform as the start point of the up-count operation by the counting unit 254, resulting in obtainment of the count value corresponding to the data component (Vrst+Vsig).

In the digital CDS, for example, the counting units 254 are set to the down-count mode for reading the reset component (Vrst) and to the up-count mode for reading the data component (Vrst+Vsig). Thus, the signal component Vsig is calculated by the automatic subtraction in the counting units 254 by obtaining a count value corresponding to the signal component Vsig.

Furthermore, the data converted from analog to digital is transferred to and held by the data storage unit 256. Before the operation of the counting unit 254 (t30), upon receipt of a memory transfer instruction pulse control signal CN8 from the timing control unit 20, the counting unit 254 transfers a result of the counting in the previous row (Hx−1) to the data storage unit 256.

Figure 11:
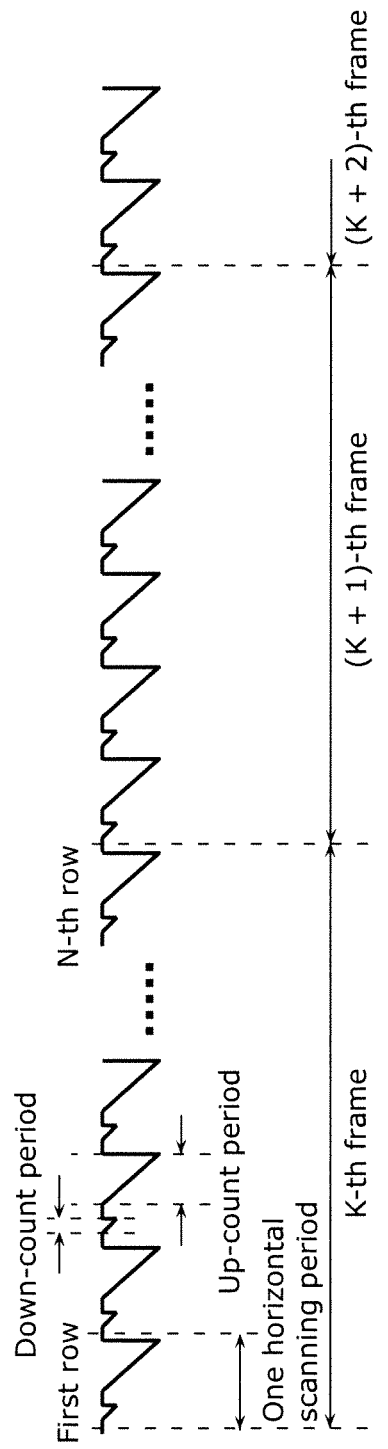
FIG. 11 illustrates a timing chart of several frames of the solid-state imaging device according to Embodiments 1 to 7.

As described above, the column AD circuit 25 performs the digital CDS when reading the pixels in all the rows Hx. Here, FIG. 11 illustrates several frame operations of an imaging sensor, according to PTL 1 and Embodiment 1. In order to read pixels in the k-th frame in each of the rows from the first row to the n-th row, a down-count period for reading a reset component of the pixels and an up-count period for reading a signal component of the pixels are necessary.

As such, the imaging sensor according to Embodiment 1 reads the unit pixels 3 of each of the rows Hx as illustrated in FIG. 11, that is, outputs video data D1 of one frame by performing AD conversion on each of the rows. Here, the AD conversion is performed during a period composed of the down-count period and the up-count period.

As described above, according to the present invention, the convergence time is accelerated by accelerating the transient response speed of the low-pass filter 300a when the pixel signal varies, and the noise characteristics are improved by delaying the transient response when the pixel signal is stable. Then, with the execution of the CDS, it is possible to reduce noise and improve the random noise occurring in the amplifying transistor in the unit pixel 3.

Here, it is preferred that the cutoff frequency of the low-pass filter narrowed for cutting off the aliasing noise by the AD conversion units is lower than half the frequency fs of the digital CDS (inverse of a time difference τ (time t22−time t12) between a time for reading the reset component and a time for reading the data component).

As described in Embodiment 1, without any sample-and-hold capacitors, the frequency fs of the digital CDS (=1/τ) changes from the time t10 to the time t14 according to a signal level when the reset component (Vrst) is read, and it changes from the time t20 to the time t24 according to a signal level when the data component (Vrst+Vsig) is read.

Examples of device noise occurring in a circuit include thermal noise that is white noise, and 1/f noise dependent on the frequency. The noise occurs from each device, such as a transistor and a resistor. Hereinafter, thermal noise that is target noise for reduction according to the present invention will be described.

Since a determinant factor of the random noise in the solid-state imaging device is the amplifying transistor T12 of the unit pixel 3, a transconductance Gm of the amplifying transistor T12 and the output resistance Rs can be expressed by Equation 1. Here, L denotes a gate length, W denotes a gate width, μ denotes mobility, Cox denotes a gate oxide film capacitance, and Id denotes a current flowing through a transistor.

[Math 1]

$$Gm=1/Rs=\sqrt{(2\cdot\mu\cdot Cox\cdot W/L\cdot Id)} \quad \text{(Equation 1)}$$

Next, thermal noise Vn occurring in the amplifying transistor T12 per frequency can be expressed by Equation 2. Furthermore, the thermal noise Vn occurring in a resistor per frequency can be generally expressed by Equation 3. Here, k denotes a Boltzmann constant, and T denotes an absolute temperature.

[Math 2]

$$Vn^2=8kT/3Gm \quad \text{(Equation 2)}$$

[Math 3]

$$Vn^2=4kTR \quad \text{(Equation 3)}$$

Furthermore, the cutoff frequency fc of a first-order low-pass filter including a resistor and a capacitor (RC) can be expressed by Equation 4.

[Math 4]

$$fc=1/(2\pi RC) \quad \text{(Equation 4)}$$

Next, noise throughout all the bands with the circuit configuration according to Embodiment 1 will be estimated. First, when the switch SW1 is turned ON, noise is determined based on thermal noise of the amplifying transistor T12. Then, the cutoff frequency is determined by the product of the output resistance Rs (=1/Gm) of the amplifying transistor T12 and the capacitance C1. Thus, a root-mean-square noise voltage throughout all the bands can be expressed by Equation 5. Here, the noise throughout all the bands for the first-order low-pass filter can be calculated by multiplying $\pi/2$ by the cutoff frequency fc.

[Math 5]

$$Vn^2 = (8kT/3Gm) \cdot (1/(2\pi \cdot Rs \cdot C1)) \cdot (\pi/2) = (2/3) \cdot kT/C1 \quad \text{(Equation 5)}$$

Next, when the switch SW1 is turned OFF, noise is determined by calculating a root mean square of thermal noise of the amplifying transistor T12 and thermal noise of the resistor R1 included in the low-pass filter 300a. Then, the cutoff frequency fc is determined by the product of the capacitance C1 and a value obtained by adding the output resistance Rs (=1/Gm) of the amplifying transistor T12 to the resistance R1. Thus, a root-mean-square noise voltage throughout all the bands can be expressed by Equation 6. Here, the root-mean-square noise voltage throughout all the bands for the first-order low-pass filter can be calculated by multiplying $\pi/2$ by the cutoff frequency fc. Furthermore, the assumption herein is that the capacitance C1 is larger than a parasitic capacitance of the vertical signal line 19 (parasitic capacitor 263 (Cp) in FIG. 13). Furthermore, a relationship of the output resistance Rs (=1/Gm) of the amplifying transistor T12<<the resistance R1 of the low-pass filter is assumed.

[Math 6]

$$Vn^2 = (8kT/3Gm + 4kTR1) \cdot (1/(2\pi(Rs+R1)C1)) \cdot (\pi/2) \approx (4kTR1) \cdot (1/(2\pi \cdot R1 \cdot C1)) \cdot (\pi/2) = kT/C1 \quad \text{(Equation 6)}$$

As such, the respective root-mean-square noise voltages throughout all the bands can be expressed by Equations 5 and 6 by switching whether or not to cause a short at both ends of the resistor R1 of the low-pass filter 300a. In the latest fine processes in which the gate length Lg is approximately smaller than or equal to 100 nm, some results of the actual measurement show that the coefficient of thermal noise of the transistor expressed by Equation 2 is not less than 8/3, thus resulting in approximation of the noise of the low-pass filter expressed by Equation 5 to the value of Equation 6. In other words, the important point here is that the root-mean-square noise voltage throughout all the bands is actually almost constant by turning ON/OFF the resistor R1 of the low-pass filter 300a.

Assuming that a low-pass filter is provided, as a first-order low-pass filter, between the output resistor Rs (=1/Gm) of the amplifying transistor T12 of the unit pixel 3 and the parasitic capacitor (Cp 263 in FIG. 13) of the vertical signal line 19 in the conventional circuit of PTL 1, the root-mean-square noise voltage throughout all the bands is expressed by $Vn^2=(2/3) \cdot kT/Cp$ as Equation 5. In other words, the root-mean-square noise voltage of the low-pass filter including the resistor Rs and the parasitic capacitor Cp throughout all the bands is theoretically determined by the capacitance Cp independent of the cutoff frequency fc. In order to reduce noise, it is necessary to highly increase the capacitance Cp. However, the problem is decrease in the transient response speed ($\tau = Rs \cdot Cp$).

Furthermore, assuming that a low-pass filter is provided, as a first-order low-pass filter, between a sample-and-hold capacitor C1 and the output resistor Rs (=1/Gm) of the amplifying transistor T12 of the unit pixel 3 in the conventional circuit of PTL 2, the root-mean-square noise voltage throughout all the bands is expressed by $Vn^2=(2/3) \cdot kT/C1$ as Equation 5. Furthermore, the assumption herein is that the sample-and-hold capacitance C1 is larger than the parasitic capacitance of the vertical signal line 19 (parasitic capacitor 263 (Cp) in FIG. 13). In other words, the noise of the low-pass filter including the resistor Rs and the sample-and-hold capacitor C1 throughout all the bands is theoretically determined by the capacitance C1 independent of the cutoff frequency fc as described above. In order to reduce noise, it is necessary to highly increase the capacitance C1. However, the problem is decrease in the transient response speed ($\tau = Rs \cdot C1$).

Furthermore, the above description assumes that an input impedance of the voltage comparator 252 is handled as a high impedance (HiZ), and the input/output of a current is 0.

Next, a relationship between the digital CDS and the cutoff frequency fc of the low-pass filter 300a will be described. The main purpose of the digital CDS is to remove the voltage component (1/f noise, etc.) that is in a relatively low frequency domain and includes a DC component in the noise component. The following will describe a combination of the present invention with the CDS, which can effectively reduce thermal noise that is white noise.

First, the CDS will be described with reference to the timing chart in FIG. 12. The column AD circuit 25 calculates the signal component Vsig of the unit pixels 3 using a voltage difference between the reset component (Vrst) that is previously stored and the data component (reset component Vrst+ signal component Vsig) that is later stored.

In the noise at a frequency relatively lower than the frequency fs of the digital CDS (inverse of a time difference (time t22−time t12) between a time for reading the reset component Vrst and a time for reading the data component Vsig), a noise voltage included in the reset component Vrst is qualitatively equal to a noise voltage included in the data component Vsig that is later stored. Thus, the noise can be reduced using the digital CDS because the difference between the noise voltages becomes 0.

On the other hand, since noise at a relatively high frequency has different noise levels between the time t22 and the time t12 and the difference between the noise voltages does not become 0, the noise cannot be reduced using the digital CDS.

In detail, a transfer function H(f) of the CDS can be expressed by Equation 7. Here, $\tau$ denotes 1/fs. The absolute square value of H(f), $|H(f)|^2$, can be expressed by Equation 8. Equation 2 qualitatively indicates that a signal or noise at a frequency f lower than a frequency fs (=1/$\tau$) of the CDS is expressed as $|H(f)|^2 \approx 0$, and is attenuated.

[Math 7]

$$H(f)=1-\exp(-2\pi f \tau) \quad \text{(Equation 7)}$$

[Math 8]

$$|H(f)|^2=2 \cdot (1-\cos(2\pi f \tau)) \quad \text{(Equation 8)}$$

As described above, the digital CDS is effective to reduce the 1/f noise in a relatively low frequency domain.

Next, the effect of the CDS on thermal noise that is white noise will be described.

Figure 14:
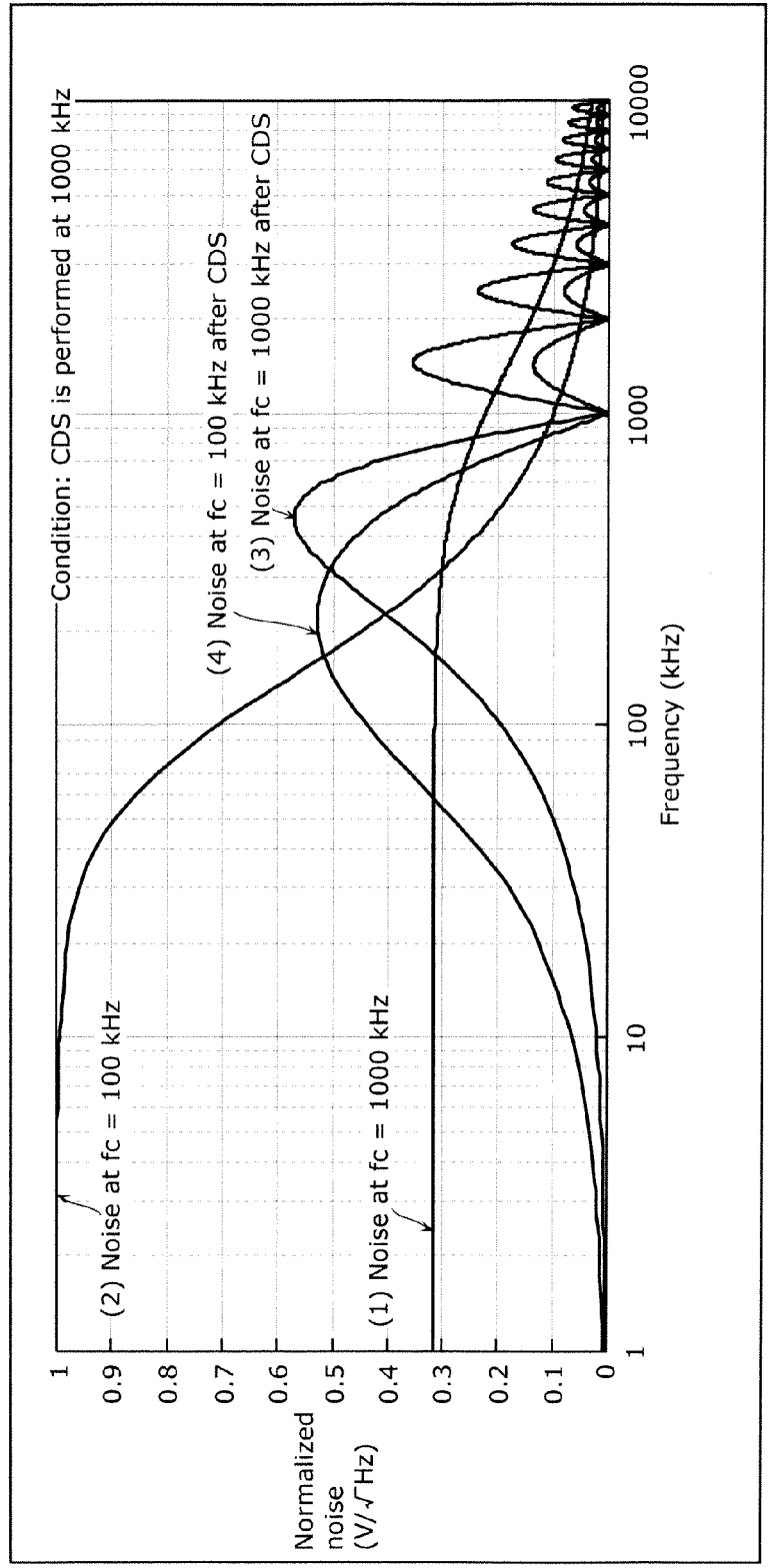
FIG. 14 is a graph indicating the result of simulation of noise occurring in the low-pass filter before and after performing the CDS.

FIG. 14 is a graph indicating the result of simulation of noise occurring in the low-pass filter including an ideal RC when the cutoff frequency fc is changed, for clarifying the description. Here, the cutoff frequency fc is determined by making the capacitance constant and increasing the resistance value R tenfold. The frequency fs of the CDS is set to 1000 kHz ($\tau$=1 us). The horizontal axis represents the frequency (at kHz), and the vertical axis represents normalized noise (at V/$\sqrt{Hz}$). (1) indicates the noise characteristics of the low-pass filter when the cutoff frequency fc=1000 kHz. (2) indicates the noise characteristics of the low-pass filter when the cutoff frequency fc=100 kHz. The noise spectrum is shifted to the low frequency side by increasing the resistance value R tenfold and decreasing the cutoff frequency. However, before performing the CDS, the root-mean-square noise voltage throughout all the bands occurring in the low-pass filter is theoretically determined to be $Vn^2=kT/C$.

(3) indicates the noise characteristics of the low-pass filter after the CDS, when the cutoff frequency fc=1000 kHz. (4) indicates the noise characteristics of the low-pass filter after performing the CDS, when the cutoff frequency fc=100 kHz. (3) and (4) show that the noise throughout all the bands after performing the CDS is more reduced as the cutoff frequency fc is lower. In other words, as the cutoff frequency fc is decreased with the CDS, the root-mean-square noise voltage occurring in the low-pass filter is reduced.

Here, Equations 7 and 8 are used as the transfer function H(f) of the CDS.

In other words, without the CDS, the root-mean-square noise voltage of the low-pass filter including the ideal RC throughout all the bands is represented by $Vn^2=kT/C$ without depending on the cutoff frequency fc. Here, the noise throughout all the bands is constant and the noise spectrum is shifted to the low frequency side by decreasing the cutoff frequency fc.

In contrast, since the noise spectrum is shifted to the low frequency side when the cutoff frequency fc is lowered, the noise mainly in the low frequency domain can be removed and the root-mean-square noise voltage throughout all the bands can be reduced.

In summary, the determinant factor of the random noise in the solid-state imaging device is the amplifying transistor T12 of the unit pixel 3. In order to reduce the absolute amount of the random noise, it is necessary to increase the size of the transistor. However, downsizing of the amplifying transistors due to the increased quality of pixels makes it difficult to reduce the absolute amount of the random noise.

Thus, as described in Embodiment 1, in order to reduce the white nose at a relatively high frequency, first, the cutoff frequency fc is decreased using the low-pass filters 300*a* to shift the noise spectrum to the low frequency side. Then, it is clear that the digital CDS is an effective means to reduce noise to the low frequency side.

However, there is a disadvantage of delaying the transient response by prioritizing the reduction of noise and simply narrowing the bandwidth of the low-pass filters 300*a*. Thus, the effective solution is to change the bandwidth of the low-pass filters 300*a* according to the timing of reading the pixel signal as Embodiment 1.

The summary of the solid-state imaging device according to Embodiment 1 will be further described below.

(a) Each of the unit pixels 3 includes: the photodiode PD1 that converts light into signal charges; the floating diffusion layer FD that holds the signal charges; the reset transistor T11 that resets the signal charges held by the floating diffusion layer; the transfer transistor T10 that transfers the signal charges from the photodiode to the floating diffusion layer; and the amplifying transistor T12 that outputs the pixel signal according to the signal charges held by the floating diffusion layer, wherein each of the low-pass filters is switchable between first filter characteristics and second filter characteristics, the second filter characteristics having (i) a low-frequency cutoff higher than a low-frequency cutoff of the first filter characteristics and (ii) a transient response speed faster than a transient response speed of the first filter characteristics, and the low-pass filter is operated with the second filter characteristics during a period in which the pixel signal output from the amplifying transistor varies, and is operated with the first filter characteristics during a period in which the pixel signal is stable.

With the configuration, the second object can be achieved. In other words, since each of the low-pass filters is operated with the second filtering characteristics of a higher low-frequency cutoff (that is, wider bandwidth) and a faster transient response speed, during the period in which the pixel signal varies.

(b) The low-pass filter includes: the resistor R1 inserted in the column signal line; and the capacitor C1 connected between a ground line and a terminal of the resistor, the terminal being closer to the correlated double sampling unit. With the configuration, when the low-pass filter simply includes a resistor and a capacitor, the noise characteristics in capturing an image in particular with low illumination by, for example, an infrared camera that features sensitivity rather than high speed can be improved.

(c) The low-pass filter further includes the first switch SW1 connected in parallel with the resistor. With the configuration, the switch can easily control switching between the first filter characteristics and the second filter characteristics.

(d) The first switch is ON during the period (T1_RS or T1_TR) in which the pixel signal output from the amplifying transistor varies, and is OFF during the period (T2_RS or T2_TR) in which the pixel signal is stable.

(e) The first switch is ON during a first period (T1_RS) including a period during which the reset transistor performs a reset operation, and is turned OFF after the first period (T2_RS), and the first switch is ON during a second period (T1_TR) including a period during which the transfer transistor performs a transfer operation, and is turned OFF after the second period (T2_TR).

(f) The solid-state imaging device further includes a reference signal generating unit configured to generate a reference signal having a ramp waveform, wherein each of the correlated double sampling units includes: a voltage comparator provided for a corresponding one of the columns; and a counter that counts a clock signal, the voltage comparator includes: a differential input unit including two transistors that receive the reference signal, and the pixel signal output from the amplifying transistor; and a load capacitor connected between output terminals of the differential input unit, the voltage comparator converts the pixel signal into a duration by comparing the pixel signal with the reference signal, the counter converts the duration into a digital signal, and the two transistors and the load capacitor function as the low-pass filter.

(g) The resistor may include a MOS transistor.

(h) The operational transconductance amplifier includes a MOS transistor.

(i) Furthermore, a method for driving a solid-state imaging device includes: operating each of the low-pass filters with the second filter characteristics during a period in which the pixel signal output from the amplifying transistor varies; and operating each of the low-pass filters with the first filter characteristics during a period in which the pixel signal is stable.

Embodiment 2

In a solid-state imaging device according to Embodiment 2, the low-pass filter further includes a first p-n junction element connected in parallel with the resistor, and a second p-n junction element connected in parallel with the resistor opposite in polarity to the first p-n junction element. The configuration can maintain a balance between the fast reading operation and improving of the noise characteristics while suppressing increase in the chip area.

Hereinafter, a solid-state imaging device and a method for driving the same according to Embodiment 2 will be described with reference to drawings.

First, the configuration of an image capturing apparatus and a solid-state imaging device according to Embodiment 2 is the same as that illustrated in FIG. 1 according to Embodiment 1.

Furthermore, the timing chart according to Embodiment 2 is the same as that in FIG. 12 according to Embodiment 1.

The circuit configuration herein is simplified by omitting the sample/hold control signal CN11 and the bandwidth-setting control signal CN12.

Figure 3A:
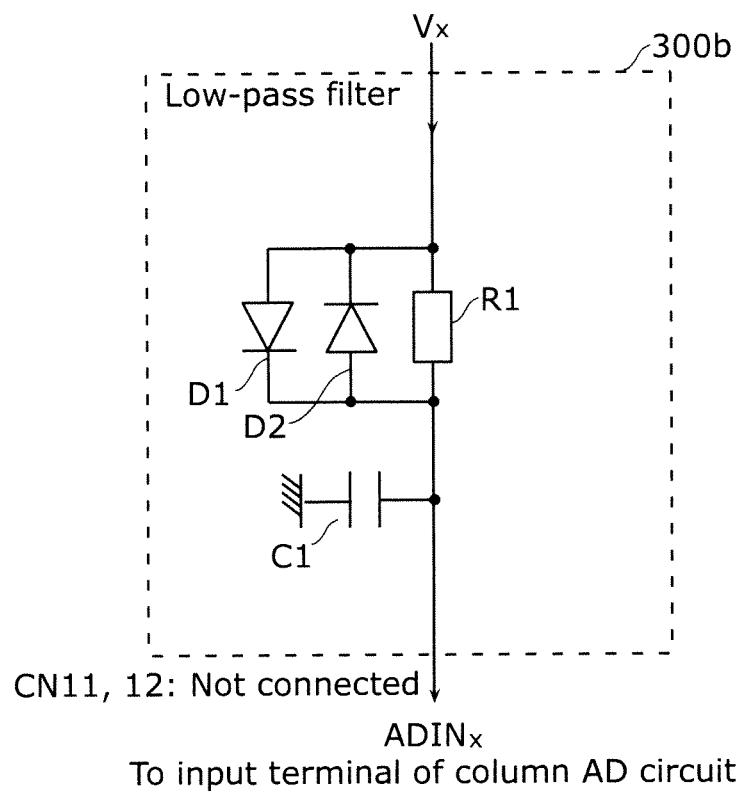
FIG. 3A illustrates an example of a circuit configuration of a low-pass filter 300b according to Embodiment 2.
Figure 3B:
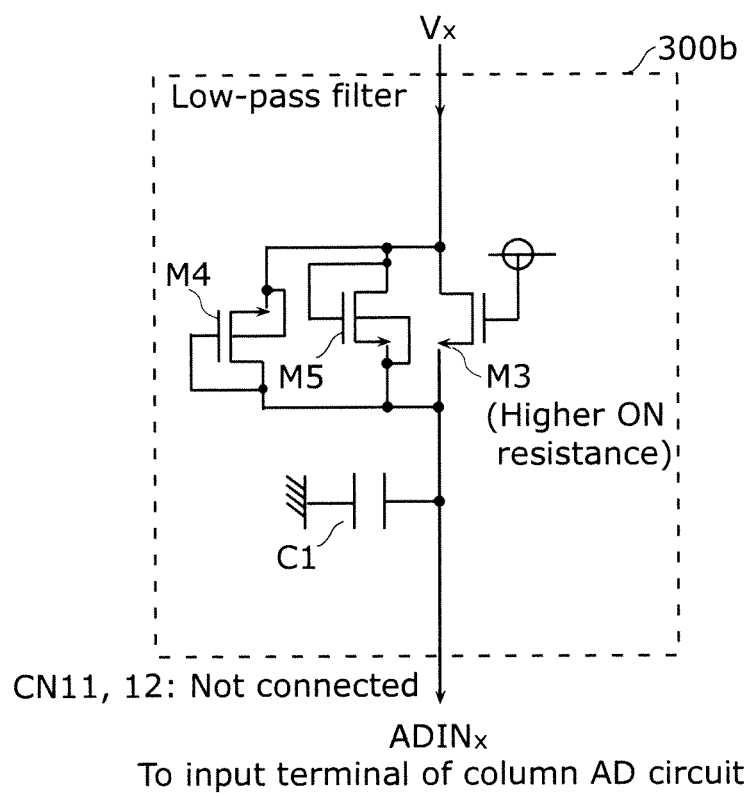
FIG. 3B illustrates an example of a circuit configuration of the low-pass filter 300b according to Embodiment 2.

FIGS. 3A and 3B illustrate examples of a circuit configuration of a low-pass filter 300b according to Embodiment 2.

In FIGS. 3A and 3B, a difference with the low-pass filter 300a in FIGS. 2A and 2B according to Embodiment 1 is connection of diodes D1 and D2 to the ends of the resistor R1 instead of the switch SW1 controlled by the bandwidth-setting control signal CN12.

In order to have a simpler configuration due to the limitation in pitch for the column area, for example, the resistor R1 may be a transistor M3 having a higher ON resistance, and the diodes D1 and D2 may be transistors M4 and M5 that are connected with the source and the back gate, as illustrated in FIG. 3B. The back gate (p type) and the drain (n type) form a parasitic diode with a p-n junction.

The diode characteristics can be expressed by Equation 9. The ON resistance at an operating point can be expressed by Equation 10. V denotes a potential difference between the ends of the diode, and I denotes a current. When a potential difference between the ends of the resistor R1 causes the current I to flow as the effect of the diodes D1 and D2, the resistor R1 has a low resistance according to Equation 10. In contrast, when no current I flows due to no potential difference between the ends of the resistor R1, the resistor R1 has a high resistance according to Equation 10.

[Math 9]

$$I = Is \cdot (\exp(qV/kT) - 1) \quad \text{(Equation 9)}$$

[Math 10]

$$r = (kT/qI) \quad \text{(Equation 10)}$$

As a result, the pixel signal can be early stable by accelerating the transient response speed during a period in which the pixel signal varies. More specifically, when the pixel signal is set to High level, the input voltage to the low-pass filter 300b becomes high, Vdb (drain-to-backgate voltage) of the transistor M4 functioning as the diode D1 increases, and a period for charging the capacitor C1 increases. Conversely, when the pixel signal is set to Low level, the input voltage to the low-pass filter 300b becomes low, Vdb of the transistor M5 functioning as the diode D2 increases, and a period for discharging the capacitor C1 increases.

When the succeeding circuit reads the pixel signal during the time when the pixel signal is stable, the effect of removing noise can be increased by decelerating the transient response speed in combination with the CDS means.

The configuration can maintain a balance between the fast reading operation and improving of the noise characteristics while suppressing increase in the chip area.

Embodiment 3

In a solid-state imaging device according to Embodiment 3, the low-pass filter further includes an operational transconductance amplifier having a positive input terminal, a negative input terminal, and an output terminal, the positive input terminal being connected to the other terminal of the resistor that is closer to the amplifying transistor, and the negative input terminal and the output terminal being connected to the terminal of the resistor that is closer to the correlated double sampling unit. The configuration eliminates the need for providing a control signal for switching between the first filter characteristics and the second filter characteristics and lines for supplying the control signal, thus suppressing increase in the area.

Hereinafter, a solid-state imaging device and a method for driving the same according to Embodiment 3 will be described with reference to drawings.

The configuration of the image capturing apparatus and the solid-state imaging device according to Embodiment 3 is the same as the configuration illustrated in FIG. 1 according to Embodiment 1.

Furthermore, the timing chart according to Embodiment 3 is the same as that in FIG. 12 according to Embodiment 1.

The circuit configuration herein is simplified by omitting the sample/hold control signal CN11 and the bandwidth-setting control signal CN12.

Figure 4A:
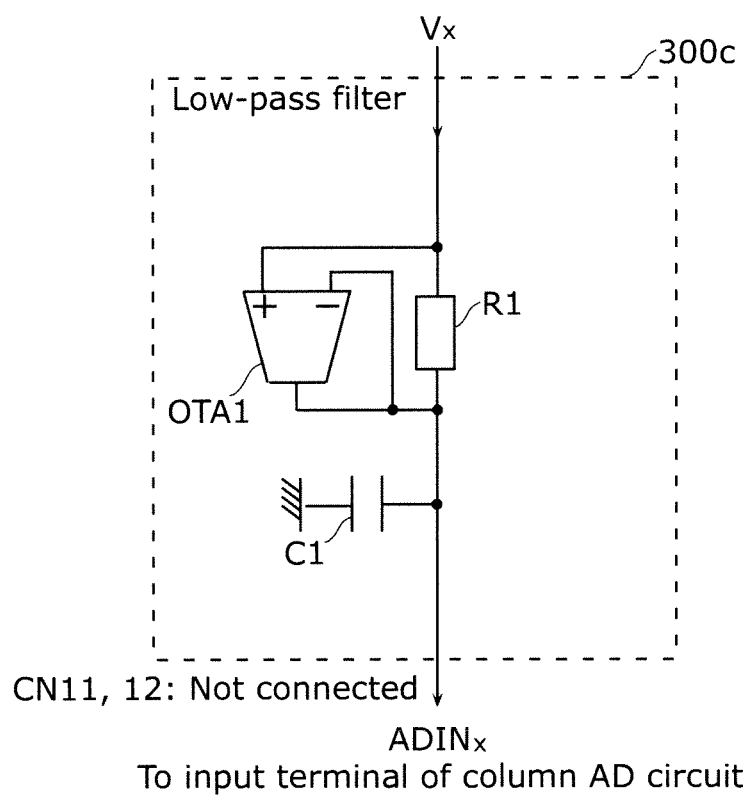
FIG. 4A illustrates an example of a circuit configuration of a low-pass filter 300c according to Embodiment 3.
Figure 4B:
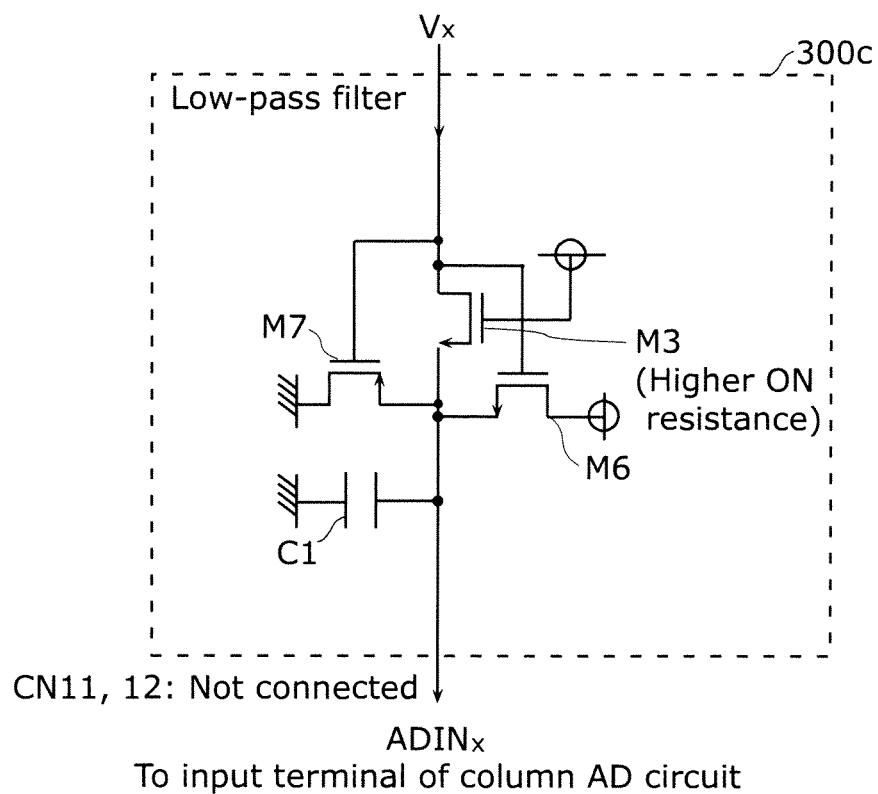
FIG. 4B illustrates an example of a circuit configuration of the low-pass filter 300c according to Embodiment 3.

FIGS. 4A and 4B illustrate examples of a circuit configuration of a low-pass filter 300c according to Embodiment 3.

In FIGS. 4A and 4B, the difference with the low-pass filter 300a in FIGS. 2A and 2B according to Embodiment 1 is connection of an operational transconductance amplifier (OTA) 1 to the ends of the resistor R1 instead of the switch SW1 controlled by the bandwidth-setting control signal CN12. The input plus terminal of the OTA 1 is connected to the input terminal of the low-pass filter 300c, and the input minus terminal and the output terminal of the OTA 1 are connected to the output terminal of the low-pass filter 300c.

In order to have a simpler configuration due to the limitation in pitch for the column area, for example, the resistor R1 may be a transistor M3 having a higher ON resistance, and the OTA 1 may be composed of transistors M6 and M7 with the source terminal and the gate terminal connected to the ends of the transistor M3 and with the drain terminal grounded with power/GND, as illustrated in FIG. 4B. The circuit functions as an operational transconductance amplifier in which the output current Io is determined by Gm·Vgs.

The characteristics of such an operational transconductance amplifier can be expressed by Equation 11. The responsivity of an output voltage when the capacitor C1 is connected as a load can be expressed by Equation 12. Since s is differentiated, 1/s clearly represents an integration operator that is a multiplicative inverse for s. Vin denotes a potential difference between input terminals, and Io denotes an output current. Here, a potential difference between the ends of the resistor R1 causes the output current Io to quickly charge the load capacitor C1 according to Equation 12, as the effect of the OTA 1. In contrast, when no output current Io flows due to no potential difference between the ends of the resistor R1, the voltage of the load capacitor C1 does not vary. Here, in order to increase the response for charging/discharging the load capacitor C1, it is necessary to increase the transconductance Gm of the OTA 1.

[Math 11]

$$Io=Gm\cdot(V(+)-V(-))=Gm\cdot Vin \quad \text{(Equation 11)}$$

[Math 12]

$$Vo=Io/(s\cdot C1)=(Gm\cdot Vin)/(s\cdot C1) \quad \text{(Equation 12)}$$

As a result, the pixel signal can be early stable by accelerating the transient response speed during a period in which the pixel signal varies. More specifically, when the pixel signal is set to High level, the input voltage of the low-pass filter 300c becomes high, Vgs of the transistor M6 functioning as the OTA 1 increases, and a period for charging the capacitor C1 increases. Conversely, when the pixel signal is set to Low level, the input voltage of the low-pass filter 300c becomes low, Vgs of the transistor M7 functioning as the OTA 1 increases, and a period for discharging the capacitor C1 increases.

When the succeeding circuit reads the pixel signal during the time when the pixel signal is stable, the effect of removing noise can be increased by decelerating the transient response speed in combination with the CDS means.

Here, when the threshold voltage Vt of the transistors M6 and M7 is adjusted by a dose amount approximately to 0V, the response speed of charging/discharging can be further accelerated.

The configuration can maintain a balance between the fast reading operation and improving of the noise characteristics while suppressing increase in the chip area.

Embodiment 4

An example of the simplest configuration of a solid-state imaging device including: a resistor inserted in a corresponding one of the column signal lines; and a capacitor connected between the column signal line and a ground line according to Embodiment 4 will be described.

Hereinafter, a solid-state imaging device and a method for driving the same according to Embodiment 4 will be described with reference to drawings.

First, the configuration of the image capturing apparatus and the solid-state imaging device according to Embodiment 4 is the same as that illustrated in FIG. 1 according to Embodiment 1.

Furthermore, the timing chart according to Embodiment 4 is the same as that in FIG. 12 according to Embodiment 1.

The circuit configuration herein is simplified by omitting the sample/hold control signal CN11 and the bandwidth-setting control signal CN12.

Figure 5A:
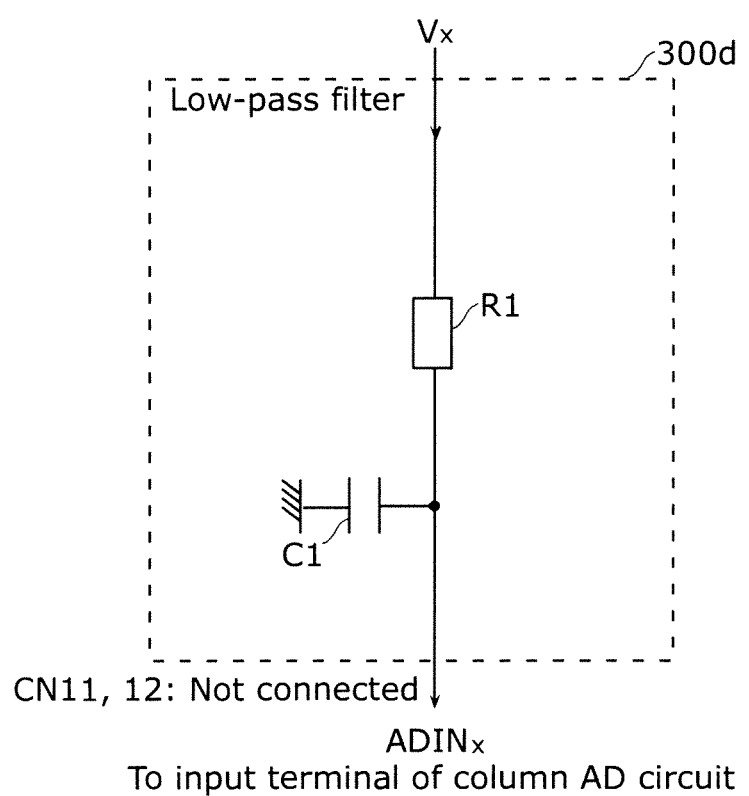
FIG. 5A illustrates an example of a circuit configuration of a low-pass filter 300d according to Embodiment 4.
Figure 5B:
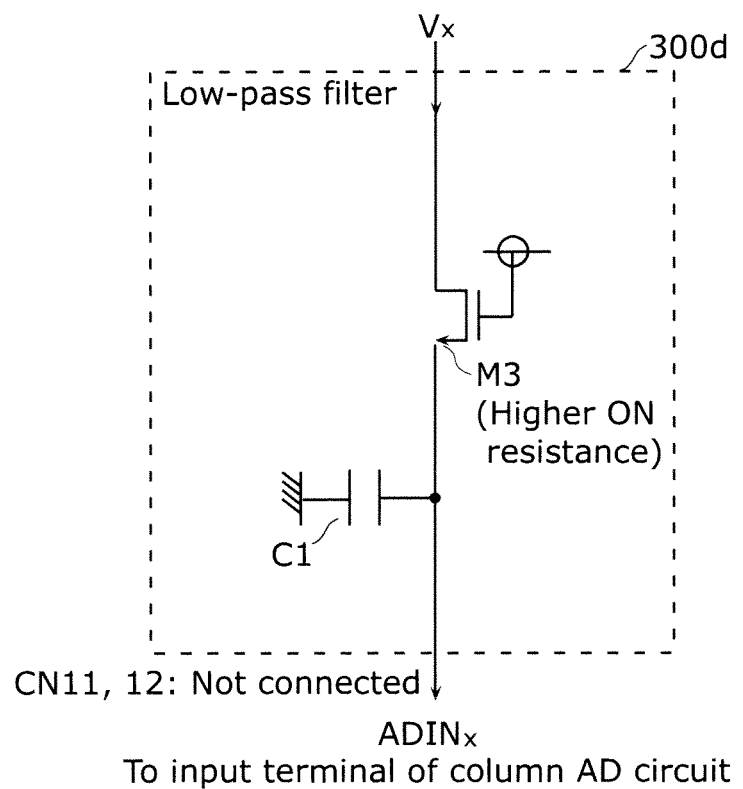
FIG. 5B illustrates an example of a circuit configuration of the low-pass filter 300d according to Embodiment 4.

FIGS. 5A and 5B illustrate examples of a circuit configuration of a low-pass filter 300d according to Embodiment 4.

In FIGS. 5A and 5B, a difference with the low-pass filter 300a in FIGS. 2A and 2B according to Embodiment 1 is the absence of the switch SW1 controlled by the bandwidth-setting control signal CN12.

In order to have a simpler configuration due to the limitation in pitch for the column area, for example, the resistor R1 may be a transistor M3 having a higher ON resistance as illustrated in FIG. 5B.

Since the transient response speed cannot be accelerated without the switch SW1, the transient response speed always remains low, and the effect of removing noise can be increased in combination with the CDS means. The low-pass filter 300d effectively operates when reduction in noise is more required than the fast reading operation.

For example, reduction in noise is important for monitoring cameras and others because images are often captured with low illumination, though the fast reading operation is not a must due to the relatively smaller number of pixels. Embodiment 4 is effective in such a situation.

Embodiment 5

In the solid-state imaging device according to Embodiment 5, each of the low-pass filters includes: a resistor inserted in a corresponding one of the column signal lines; and a capacitor connected between the column signal line and a ground line, the solid-state imaging device further includes signal holding units each provided for the column signal line and configured to sample and hold an analog signal output from the column signal line, each of the signal holding units includes a second switch inserted in the column signal line between the resistor and the correlated double sampling unit, the capacitor is connected between the column signal line and the ground line, the column signal line being located between the second switch and the correlated double sampling unit, and the capacitor functions as a part of the low-pass filter with the second switch ON before the correlated double sampling unit performs the correlated double sampling, and functions as a part of the signal holding unit with the second switch OFF during the time when the correlated double sampling unit performs the correlated double sampling. The configuration allows sharing the capacitor between the low-pass filter and the sample/hold unit, and suppressing increase in the area.

Here, a set of the second switch and the resistor may be replaced with a switch having a higher ON resistance (that is, ON resistance comparable to that of the resistor). With the configuration, the number of circuit elements can be reduced.

Here, the low-pass filter further includes a first switch connected in parallel with the resistor.

Hereinafter, a solid-state imaging device and a method for driving the same according to Embodiment 5 will be described with reference to drawings.

First, the configuration of the image capturing apparatus and the solid-state imaging device according to Embodiment 5 is the same as the configuration illustrated in FIG. 1 according to Embodiment 1.

Furthermore, the timing chart according to Embodiment 5 is the same as that in FIG. 12 according to Embodiment 1.

Figure 6A:
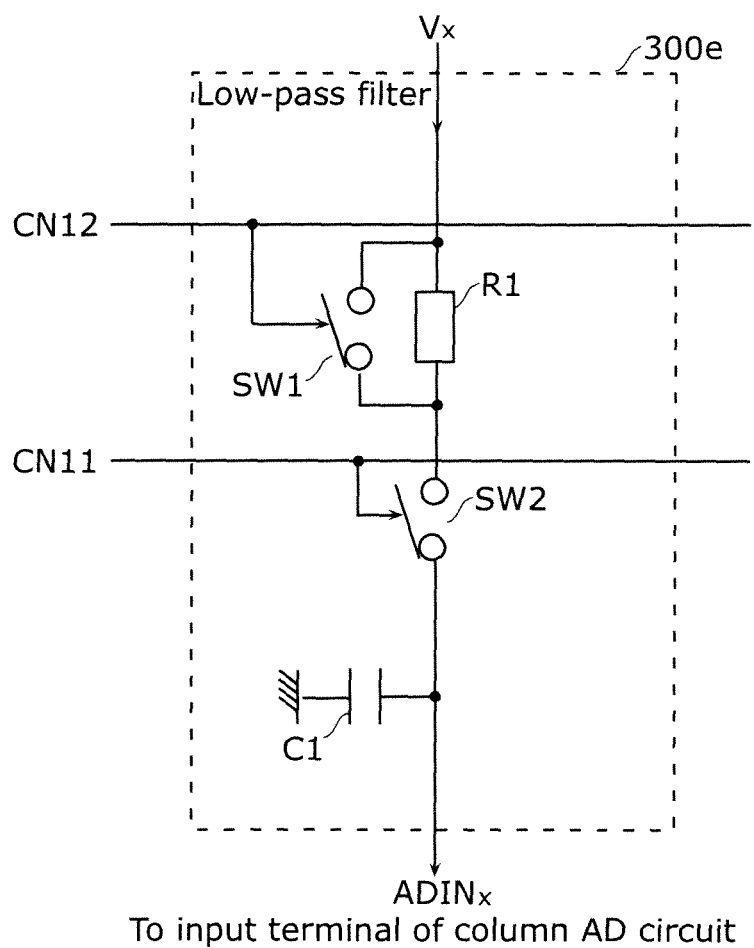
FIG. 6A illustrates an example of a circuit configuration of a low-pass filter 300e according to Embodiment 5.
Figure 6B:
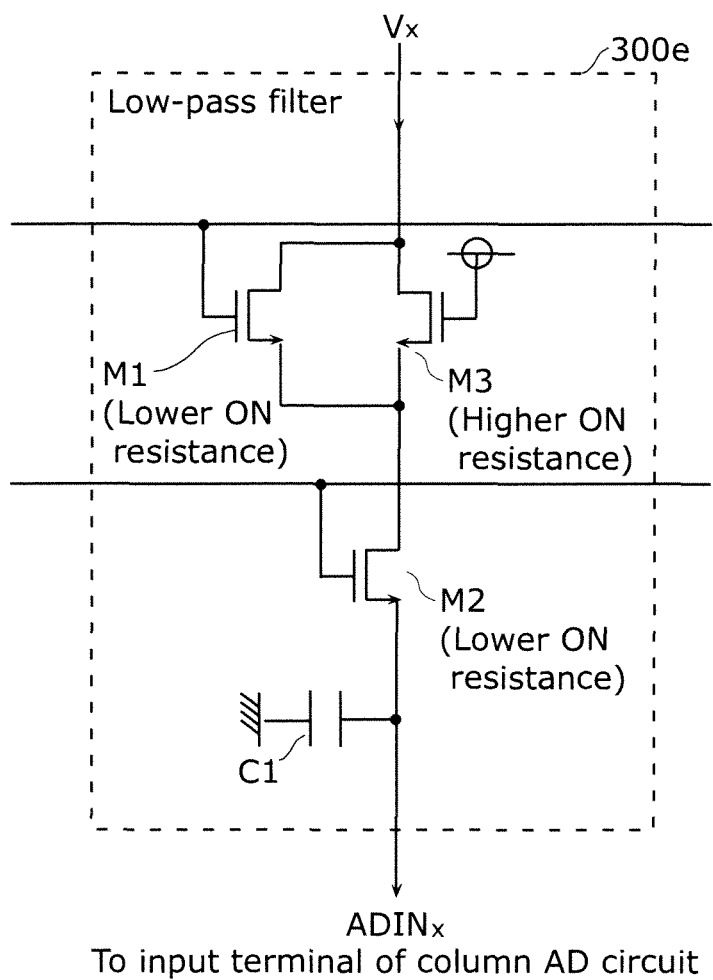
FIG. 6B illustrates an example of a circuit configuration of the low-pass filter 300e according to Embodiment 5.

FIGS. 6A and 6B illustrate examples of a circuit configuration of a low-pass filter 300e according to Embodiment 5.

In FIGS. 6A and 6B, a difference with the low-pass filter 300a in FIGS. 2A and 2B according to Embodiment 1 is controlling of the switch SW2, between the resistor R1 and the capacitor C1, by the sample/hold control signal CN11.

In order to have a simpler configuration due to the limitation in pitch for the column area, for example, the switch SW1 may be a transistor M1 having a lower ON resistance, the switch SW2 may be a transistor M2 having a lower ON resistance, and the resistor R1 may be a transistor M3 having a higher ON resistance as illustrated in FIG. 6B.

Here, the capacitor C1 functions not only as a part of the low-pass filter but also as a charge holding (sample/hold) unit for holding an analog signal. In other words, since the capacitor serves as the low-pass filter and the sample/hold unit, the increase in the area can be suppressed.

The configuration will be described using the sample/hold control signal CN11 in the timing chart in FIG. 12.

When the reset component (Vrst) is read, the pixel signal can be early stable by using the bandwidth-setting control signal CN12 and turning ON the switch SW1 for accelerating the transient response speed during a period (T1_RS period) in which the pixel signal varies. When the succeeding circuit reads the pixel signal during a period (T2_RS period) in which the pixel signal is stable, the effect of removing noise can be increased by turning OFF the switch SW1 for decelerating the transient response speed.

Furthermore, after (i) the switch SW1 controlled by the bandwidth-setting control signal CN12 is turned OFF (time t6), (ii) the pixel signal is stable (after Th_RS), and (iii) the switch SW2 remains OFF (time t7=time t6+after Th_RS), the column AD circuit 25 starts the conversion operation.

Furthermore, when the data component (reset component Vrst+signal component Vsig) is read, the pixel signal can be early stable by using the bandwidth-setting control signal CN12 and turning ON the switch SW1 for accelerating the transient response speed during a period (T1_TR period) in which the pixel signal varies. When the succeeding circuit reads the pixel signal during a period (T2_TR period) in which the pixel signal is stable, the effect of removing noise can be increased by turning OFF the switch SW1 for decelerating the transient response speed.

Furthermore, after (i) the switch SW1 controlled by the bandwidth-setting control signal CN12 is turned OFF (time t18), (ii) the pixel signal is stable (after Th_TR), and (iii) the switch SW2 remains OFF (time t19=time t18+after Th_TR), the column AD circuit 25 starts the conversion operation.

Here, the conversion operation on the reset component (Vrst) by the column AD circuit 25 may be performed as a series operation or a parallel operation with the reading operation of the data component (reset component Vrst+signal component Vsig) to the vertical signal line 19. The advantage of the series operation is that the conversion operation can be stably performed without any variation in the pixel signal, such as pixel defects, because the capacitor C1 holds the pixel signal even during the AD conversion operation. In contrast, the advantage of the parallel operation is the fast reading operation.

Here, the frequency fs of the digital CDS is represented by 1/(a time difference τ (time t19−time t7) between a time for reading the reset component and a time for reading the data component) when the signal holding (sample/hold) unit of this configuration is present.

Here, it is preferred that the cutoff frequency of the low-pass filter narrowed for cutting off the aliasing noise by the AD conversion unit is lower than half the frequency fs of the digital CDS.

Since the capacitor C1 may serve as the sample/hold unit and the low-pass filter, it is possible to maintain a balance between the fast reading operation and improving of the noise characteristics while suppressing increase in the chip area.

Embodiment 6

In the solid-state imaging device according to Embodiment 6, the low-pass filter further includes a first switch having (i) a terminal connected to the column signal line of the resistor that is closer to the amplifying transistor, and (ii) the other terminal connected to the column signal line of the second switch that is closer to the correlated double sampling unit. The configuration allows sharing the capacitor between the low-pass filter and the sample/hold unit, and suppressing increase in the area.

Hereinafter, a solid-state imaging device and a method for driving the same according to Embodiment 6 will be described with reference to drawings.

First, the configuration of the image capturing apparatus and the solid-state imaging device according to Embodiment 6 is the same as the configuration illustrated in FIG. 1 according to Embodiment 1.

Furthermore, the timing chart according to Embodiment 6 is the same as that in FIG. 1 according to Embodiment 1.

Figure 7A:
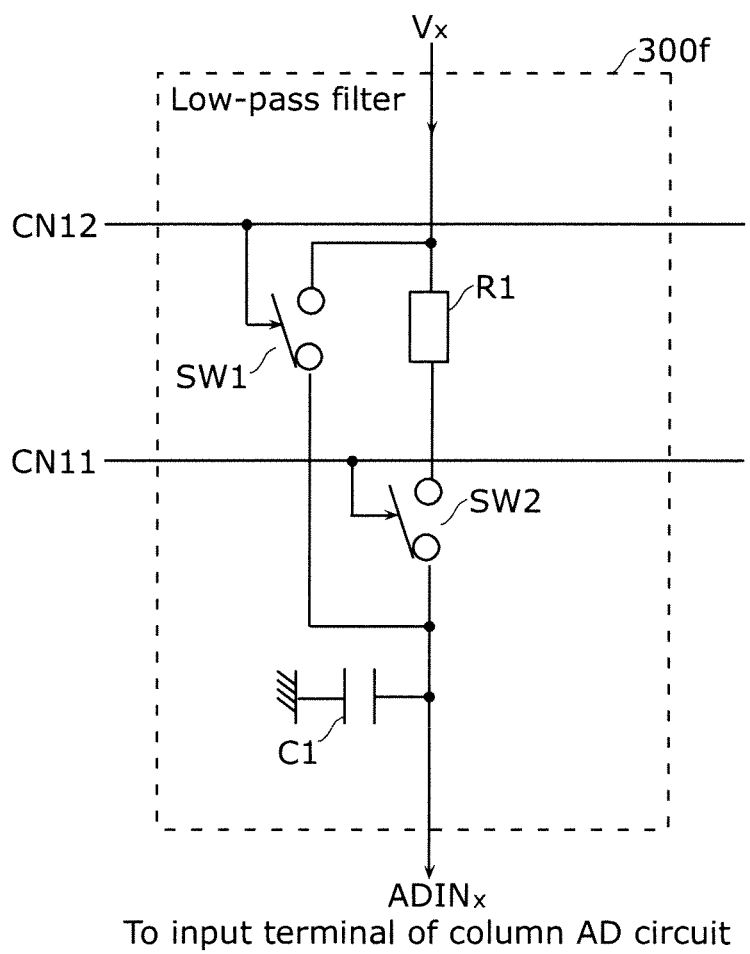
FIG. 7A illustrates an example of a circuit configuration of a low-pass filter 300f according to Embodiment 6.
Figure 7B:
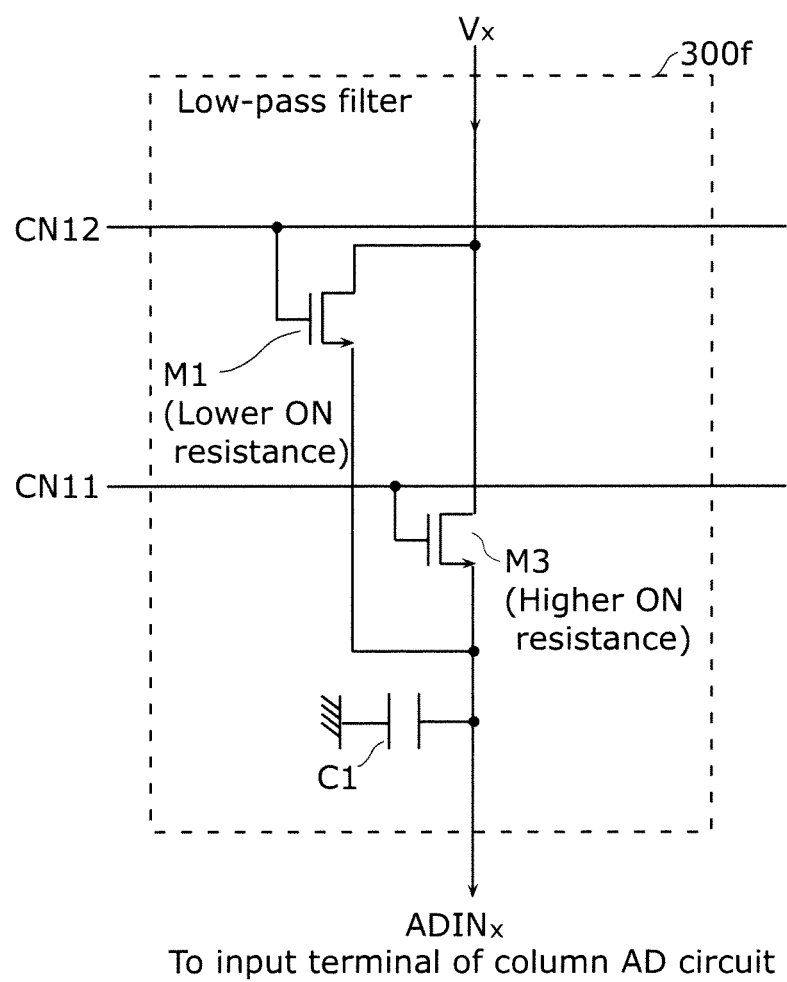
FIG. 7B illustrates an example of a circuit configuration of the low-pass filter 300f according to Embodiment 6.

FIGS. 7A and 7B illustrate examples of a circuit configuration of a low-pass filter 300f according to Embodiment 6.

In FIGS. 7A and 7B, differences with the low-pass filter 300a in FIGS. 2A and 2B according to Embodiment 1 are: controlling of the switch SW2, between the resistor R1 and the capacitor C1, by the sample/hold control signal CN11; and controlling of the switch SW1 by the bandwidth-setting control signal CN12 by connecting, to the ends of the switch SW1, one of the ends of the resistor R1 closer to the vertical signal line 19 and one of the ends of the switch SW2 closer to the ADC input line 40.

In order to have a simpler configuration due to the limitation in pitch for the column area, for example, the switch SW1 may be a transistor M1 having a lower ON resistance, and a set of the switch SW2 and the resistor R1 may be a transistor M3 having a higher ON resistance as illustrated in FIG. 7B. Accordingly, compared with Embodiment 5 describing the sample/hold function, the number of elements can be reduced by 1, and the elements can be easily arranged in despite of the limitation in pitch for the column area.

Here, the capacitor C1 functions not only as a part of the low-pass filter but also as a charge holding (sample/hold) unit for holding an analog signal. In other words, since the capacitor serves as the low-pass filter and the sample/hold unit, the increase in the area can be suppressed.

The configuration will be described using the sample/hold control signal CN11 in the timing chart in FIG. 12.

When the reset component (Vrst) is read, the pixel signal can be early stable by using the bandwidth-setting control signal CN12 and turning ON the switch SW1 for accelerating the transient response speed during a period (T1_RS period) in which the pixel signal varies. When the succeeding circuit reads the pixel signal during a period (T2_RS period) in which the pixel signal is stable, the effect of removing noise can be increased by turning OFF the switch SW1 for decelerating the transient response speed.

Furthermore, after (i) the switch SW1 controlled by the bandwidth-setting control signal CN12 is turned OFF (time t6), (ii) the pixel signal is stable (after Th_RS), and (iii) the switch SW2 remains OFF (time t7=time t6+after Th_RS), the column AD circuit 25 starts the conversion operation.

Furthermore, when the data component (reset component Vrst+signal component Vsig) is read, the pixel signal can be early stable by using the bandwidth-setting control signal CN12 and turning ON the switch SW1 for accelerating the transient response speed during a period (T1_TR period) in which the pixel signal varies. When the succeeding circuit reads the pixel signal during a period (T2_TR period) in which the pixel signal is stable, the effect of removing noise can be increased by turning OFF the switch SW1 for decelerating the transient response speed.

Furthermore, after (i) the switch SW1 controlled by the bandwidth-setting control signal CN12 is turned OFF (time t18), (ii) the pixel signal is stable (after Th_TR), and (iii) the switch SW2 remains OFF (time t19=time t18+after Th_TR), the column AD circuit 25 starts the conversion operation.

Here, the conversion operation on the reset component (Vrst) by the column AD circuit 25 may be performed as a series operation or a parallel operation with the reading operation of the data component (reset component Vrst+signal component Vsig) to the vertical signal line 19. The advantage of the series operation according to Embodiment 6 is that the conversion operation can be stably performed without any variation in the pixel signal, such as pixel defects, because the capacitor C1 holds the pixel signal even during the AD conversion operation. In contrast, the advantage of the parallel operation is the fast reading operation.

Here, the frequency fs of the digital CDS is represented by 1/(a time difference τ (time t19−time t7) between a time for reading the reset component and a time for reading the data component) when the signal holding (sample/hold) unit of this configuration is present.

Here, it is preferred that the cutoff frequency of the low-pass filter narrowed for cutting off the aliasing noise by the AD conversion units is lower than half the frequency fs of the digital CDS.

Since the capacitor C1 for the sample/hold unit may also serve as the low-pass filter, it is possible to maintain a balance between the fast reading operation and improving of the noise characteristics while suppressing increase in the chip area.

Embodiment 7

Hereinafter, a solid-state imaging device and a method for driving the same according to Embodiment 7 will be described with reference to drawings.

First, a configuration of the image capturing apparatus and the solid-state imaging device according to Embodiment 7 is the same as the configuration illustrated in FIG. 1 according to Embodiment 1.

Furthermore, the timing chart according to Embodiment 7 is the same as that in FIG. 12 according to Embodiment 1.

The circuit configuration herein is simplified by omitting the sample/hold control signal CN11 and the bandwidth-setting control signal CN12.

Figure 8:
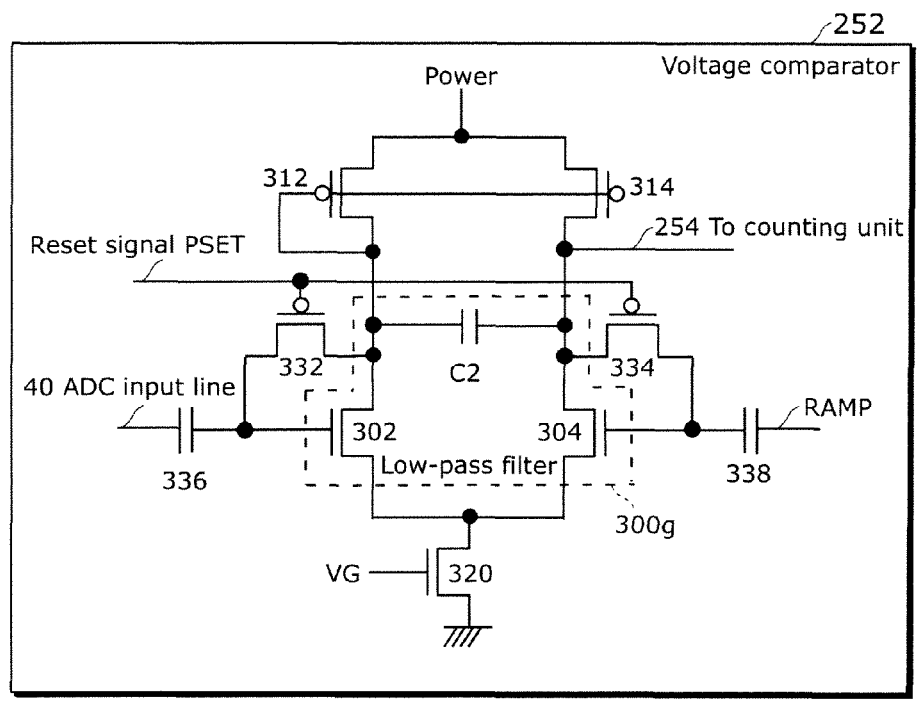
FIG. 8 illustrates an example of a circuit configuration of a low-pass filter 300g according to Embodiment 7.

FIG. 8 illustrates an example of a circuit configuration of a low-pass filter 300g according to Embodiment 7. The low-pass filter 300g is included in each of the voltage comparators 252 preceding the CDS units. The voltage comparator 252 is a high-gain amplifier of a differential input type. The difference with the voltage comparator 252 according to Embodiment 1 is connection of a capacitor C2 between output terminals of the differential load. Since the bandwidth of the low-pass filter 300g is limited so that the low-pass filter 300g operates as a Gm-C filter, thermal noise and 1/f noise of differential input transistors 302 and 304 and differential load transistors 312 and 314 can be reduced.

Assuming that Gmn denotes a transconductance Gm of the differential input transistors 302 and 304 and Gmp denotes a transconductance Gm of the differential load transistors 312 and 314 only in view of thermal noise for simplification, equivalent input noise Vin^2 per frequency can be expressed by Equation 15 using Equations 13 and 14. Accordingly, it is clarified that reduction of the equivalent input noise requires a larger value of Gmn and a smaller value of Gmp.

[Math 13]

$$Vn\hat{}2 = 8kT/3Gmn \quad \text{(Equation 13)}$$

[Math 14]

$$Vn\hat{}2 = 8kT/3Gmp \quad \text{(Equation 14)}$$

[Math 15]

$$Vin\hat{}2 = 2\cdot Vnn\hat{}2 + 2\cdot((Gmp/Gmn)\cdot Vnp)\hat{}2 \quad \text{(Equation 15)}$$

Furthermore, the cutoff frequency of the low-pass filter can be expressed by Equation 16 assuming C=C2 and R=1/Gmn. Here, the transconductance Gmp of the differential load transistors 312 and 314 are assumed to be smaller.

[Math 16]

$$fc = 1/(2\pi\cdot R\cdot C) = Gmn/(2\pi\cdot 2C2) \quad \text{(Equation 16)}$$

With the configuration of the Gm-C filter, the bandwidth of the low-pass filter 300g is limited, the effect of noise reduction can be increased, and the equivalent input noise Vin^2 through all the bands can be expressed by Equation 17 using the equivalent input noise (Equation 15) and the cutoff frequency (Equation 16). Here, assuming that the low-pass filter 300g is a first-order low-pass filter, the root-mean-square noise voltage throughout all the bands can be calculated by multiplying π/2 by the cutoff frequency fc.

[Math 17]

$$Vn\hat{}2 = Vin\hat{}2 \cdot fc\cdot(\pi/2) \quad \text{(Equation 17)}$$

As such, the cutoff frequency fc can be narrowed by increasing the load capacitance of the capacitor C2, and the noise can be reduced.

Although the low-pass filter 300d illustrated in FIGS. 5A and 5B according to Embodiment 4 has difficulty in the fast reading operation due to no switch SW1 for setting a bandwidth, the low-pass filter 300g can maintain a balance between the fast reading operation and reduction in the noise. This is because the voltage comparator 252 that is the high-gain amplifier switches output according to slight change in the RAMP signal, even when the transient response speed is low.

For example, when the RAMP signal that temporally varies with a ramp waveform at a predetermined changing rate is changed by 1 LSB=200 µV and the output signal is to be changed by 2.8 V, the gain has only to be 2.8V/200 µV≈80 dB. When the gain of the voltage comparator 252 is insufficient, the gain can be easily increased by changing the amplifier structure of the voltage comparator 252 to a two-step structure or a three-step structure. Furthermore, although slight delay in the transient response speed may cause variations, for example, clock skew, influence of the delay can be eliminated using the digital CDS.

Since the signal holding (sample/hold) unit is not present with concurrent use of the configurations according to Embodiments 1 to 4, the frequency fs of the digital CDS is represented by 1/(a time difference τ (time t22−time t12) between a time for reading the reset component and a time for reading the data component).

In contrast, when the signal holding (sample/hold) unit is present with concurrent use of the configurations according to Embodiments 5 and 6, the frequency fs of the digital CDS is represented by 1/(a time difference τ (time t19−time t7) between a time for reading the reset component and a time for reading the data component).

Here, it is preferred that the cutoff frequency of the low-pass filter narrowed for cutting off the aliasing noise by the AD conversion units is lower than half the frequency fs of the digital CDS.

FIG. 8 illustrates the differential-input-type amplifier structure. When a pixel signal unit in FIG. 8 holds voltage and the AD conversion is performed on the signal voltage, the same effect of the present invention can be obtained as well. Thus, the structure of the voltage comparators 252 is not limited to that of FIG. 8.

Since the transient response speed cannot be accelerated without the switch SW1 in the low-pass filter 300g as described in Embodiment 1, the effect of removing noise can be increased in combination with the CDS means because the noise spectrum can be shifted to the low frequency side even when the transient response speed remains low.

Furthermore, it is preferred that a cutoff frequency of the low-pass filter is lower than half a frequency for reading the reset component and the data component on both of which the correlated double sampling is performed. Since the noise spectrum is shifted to the low frequency side even when the transient response speed remains low, the effect of removing noise can be increased with this configuration.

Embodiment 8

Hereinafter, a solid-state imaging device and a method for driving the same according to Embodiment 8 will be described with reference to drawings.

Figure 9:
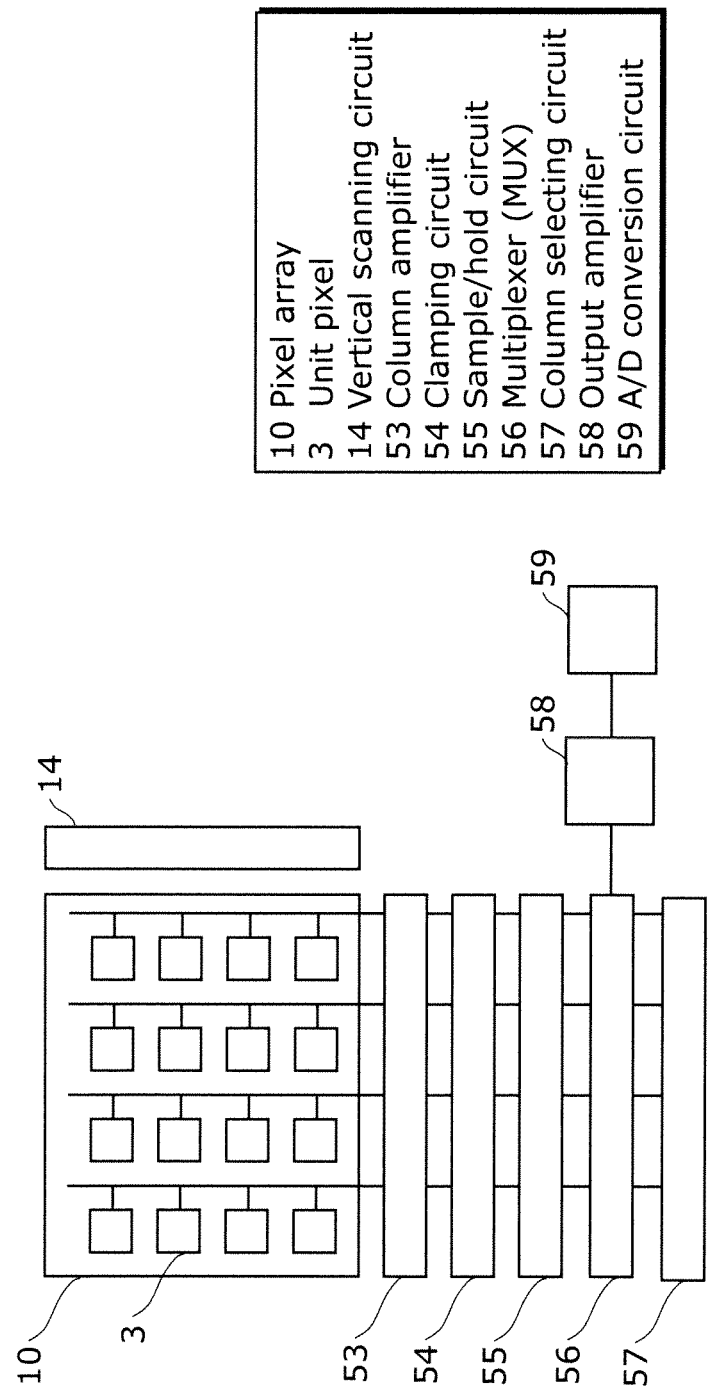
FIG. 9 illustrates an example of a circuit block diagram of a solid-state imaging device according to Embodiment 8.

FIG. 9 illustrates an overall configuration of a solid-state imaging device according to Embodiment 8. The solid-state imaging device includes a pixel array 10, a vertical scanning circuit 14, a column amplifier 53, a clamping circuit 54, a sample/hold circuit 55, a multiplexer (MUX) 56, a column selecting circuit 57, an output amplifier 58, and an A/D conversion circuit 59.

Here, the column amplifier 53 includes an array of basic units in the column direction, and amplifies an output signal from the unit pixels per row.

The clamping circuit 54 includes an array of basic units in the column direction, and amplifies the pixel signal output from the column amplifier 53 per row.

The sample/hold circuit 55 includes an array of basic units in the column direction, and amplifies the output signal from the clamping circuit 54 per row.

The MUX 56 switches the connection between each of basic units of the sample/hold circuit 55 and the output amplifier.

The column selecting circuit 57 includes control lines, and sequentially selects a column of the MUX 56.

The output amplifier 58 receives an output signal of the sample-and-hold capacitor C1 through the MUX 56, amplifies the output signal, and outputs the amplified signal to outside of the chip.

Figure 10:
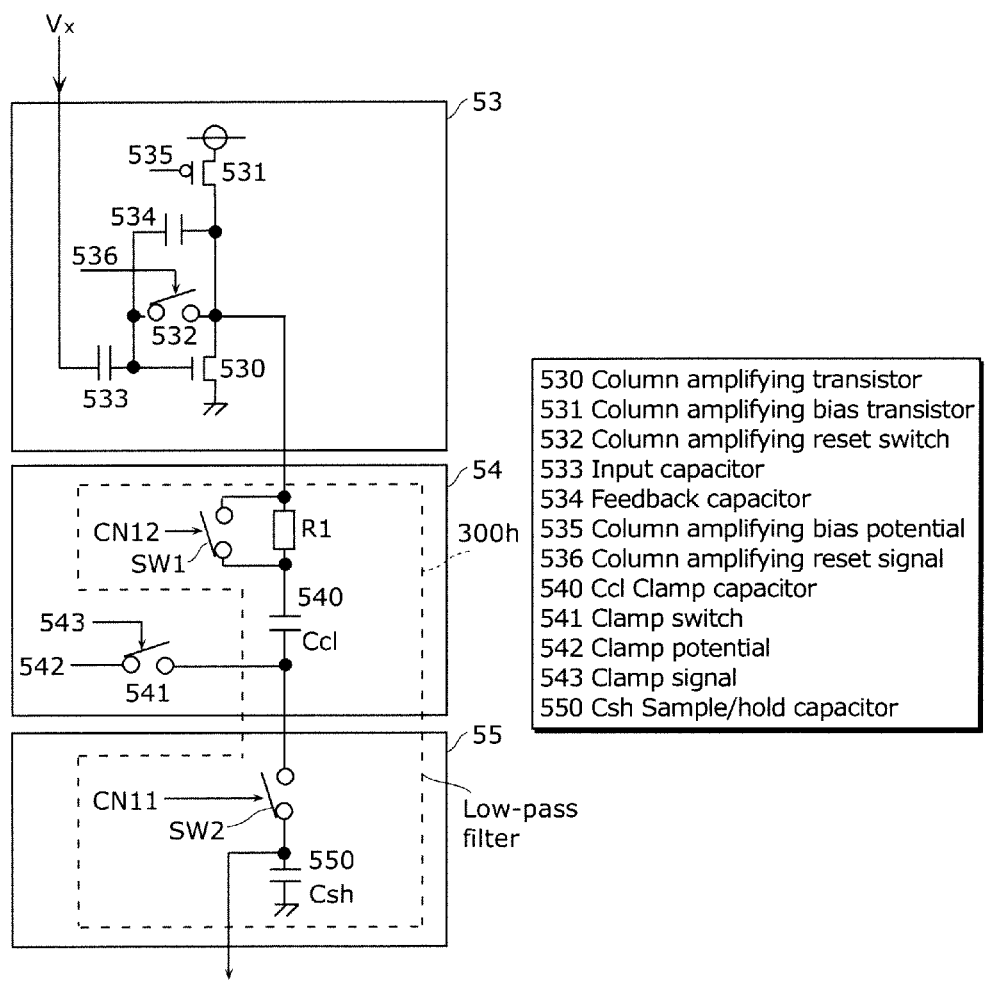
FIG. 10 illustrates an example of a circuit configuration of a column circuit according to Embodiment 8.

FIG. 10 illustrates the details of a column circuit including the column amplifier 53, the clamping circuit 54, and the sample/hold circuit 55. One of the functions of the column circuit is to temporarily hold a signal indicating a difference between the reset component (Vrst) and the data component (Vrst+Vsig) that are output from the pixel circuit, and to output the signal to the MUX 56.

The column amplifier 53 includes: an input capacitor 533 (Cin) having a terminal that receives a signal from a pixel unit; a column amplifying transistor 530 that has a gate connected to the other terminal of the input capacitor 533 and amplifies the signal from the pixel unit; a column amplifying bias transistor 531 that has a gate connected to a column amplifying bias potential 535 and supplies a driving current to the column amplifying transistor 530; a feedback capacitor 534 (Cfb) that determines the size of a signal amplified by the column amplifying transistor 530; and a column amplifying reset switch 532 having a gate that receives a column amplifying reset signal 536, and performs a reset operation for setting the output of the column amplifier 53 to a predetermined potential.

The clamping circuit 54 includes: a clamp capacitor 540 (Ccl) that receives the output of the column amplifier 53 and obtains a difference between the reset component (Vrst) and the data component (Vrst+Vsig), that is, the signal component (Vsig); and a clamp switch SW541 that has a gate receiving a clamp signal 543 and sets, to a clamp potential VCL542, a potential of a terminal opposite to the column amplifier 53.

Furthermore, the sample/hold circuit 55 includes a sample/hold capacitor 550 (Csh) that temporarily holds the pixel signal, and a sample/hold capacitor input switch SW2 that turns ON/OFF of a signal to be input to the sample/hold capacitor 550 (Csh).

Here, when the analog CDS is performed on the reset component (Vrst) and the data component (Vrst+Vsig), the potential of the sample/hold capacitor Csh varies by Ccl/(Ccl+Csh)·Vsig. The change in electrical potential is represented by a signal component (Vsig) corresponding to the difference between the reset component and the data component in the vertical signal line 19, that is, a pixel signal. As such, the clamping circuit 54 and the sample/hold circuit 55 function as a CDS unit.

The difference with the low-pass filter 300e in which a capacitor is used for a sample holding operation and a low-pass filter in FIGS. 6A and 6B according to Embodiment 5 is that a low-pass filter 300h according to Embodiment 8 includes the clamp capacitor Ccl between the resistor R1 and the switch SW2.

Here, the sample/hold capacitor Csh and the clamp capacitor Ccl function, with the resistor R1, as a part of the low-pass filter (the capacitance value is a series capacitance) as well as function as a signal holding (sample/hold) unit.

As a result, the pixel signal can be early stable with the bandwidth-setting control signal CN12 by turning ON the switch SW1 and accelerating the transient response speed during a period in which the pixel signal varies. More specifically, the cutoff frequency of the low-pass filter can be expressed by Equation 18 assuming C=(Ccl·Csh)/(Ccl+Csh) and R=1/Gmamp. Here, Gmamp denotes a transconductance of the column amplifying transistor 530. The transconductance is set to a larger value in order to increase an open loop gain of the column amplifier 53 and reduce the variations in gain between the columns.

On the other hand, when the succeeding circuit turns OFF the switch SW1 and reads the pixel signal during the time when the pixel signal is stable, the effect of removing noise can be increased by decelerating the transient response speed. Here, more specifically, the cutoff frequency of the low-pass filter can be expressed by Equation 18 assuming C=(Ccl·Csh)/(Ccl+Csh) and R=R1+1/Gmamp.

[Math 18]

$$fc=1/(2\pi RC) \qquad \text{(Equation 18)}$$

After turning OFF the switch SW1 and the pixel signal is stable, the switch SW2 remains OFF. Then, the MUX 56 that also functions as a horizontal scanning circuit subsequently reads an analog signal held in the sample/hold capacitor Csh of the CDS circuit.

Since the sample/hold capacitor Csh and the clamp capacitor Ccl can be also used for the low-pass filter, it is possible to maintain a balance between the fast reading operation and improving of the noise characteristics while suppressing increase in the chip area.

Here, the frequency fs of the digital CDS is represented by 1/(a time difference τ between a time for reading the reset component and a time for reading the data component) when the signal holding (sample/hold) unit of this configuration is present.

Here, it is preferred that the cutoff frequency of the low-pass filter narrowed for cutting off the aliasing noise by the AD conversion unit is lower than half the frequency fs of the digital CDS.

Although the column AD circuit 25 having the digital CDS function for converting an analog signal output for each column into a digital signal is provided for each of the columns according to Embodiments 1 to 7, a configuration including (i) the analog CDS circuit provided for each of the columns, (ii) the sample/hold capacitor Csh that temporarily holds a pixel signal that cancels noise, (iii) the MUX 56 that has functions of a horizontal scanning circuit and subsequently reads an analog signal held in the CDS circuit, and (iv) the A/D conversion circuit 59 that converts the analog signal into a digital signal may be used instead as in Embodiment 8.

Although the resistor R1 is inserted between the column amplifier 53 and the clamp capacitor 540 (Ccl), it may be inserted between the clamp capacitor 540 (Ccl) and the sample/hold capacitor 550 (Csh).

(Summary)

As described above, a signal component S of a solid-state imaging device is generally determined in proportion to an opening area of a photoelectric converting unit, and a noise component N needs to be reduced (improved) by 12 dB to maintain an S/N ratio because the signal component S is reduced by ¼ times (12 dB) when the size of each of pixels is halved (½ times). The present invention can fulfill the requirement.

Furthermore, the increased quality of pixels in solid-state imaging devices leads to downsizing of the gate length L and the gate width W of the amplifying transistor included in each of the unit pixels. Thus, noise tends to be deteriorated. However, the present invention can satisfy requirements for the noise reduction.

Generally, noise occurring in the solid-state imaging devices can be differentiated between fixed pattern noise (FPN) and random noise, depending on the type. Since a column or a pixel from which the FPN occurs is fixed for each device, a large portion of the noise can be eliminated by being optimized for each of the devices using the correction technique, such as a digital signal processor (DSP) that is connected to a subsequent stage of the solid-state imaging device. In contrast, since the latter random noise whose noise level is random mainly occurs in the amplifying transistor in the pixel, it is impossible to correct the noise for each of the devices. However, the present invention can reduce the absolute amount of the noise, and solve the problem.

In other words, a solid-state imaging device according to the present invention includes: a plurality of the unit pixels 3 that are two-dimensionally arranged in rows and columns; the low-pass filters 300 (*a* to *h*) arranged one-to-one for the columns of the unit pixels 3 for reducing noise of an analog signal output from the unit pixel 3 in a corresponding one of the columns; and the CDS units which are provided one-to-one for the columns of the unit pixels 3 and each of which samples a signal component from a pixel signal output from the low-pass filter 300.

In combination with the CDS units, the low-pass filters 300 (*a* to *c*, *e* to *f*, and *h*) can particularly improve the noise characteristics occurring in the amplifying transistor T12 of the pixel by accelerating the transient response speed with increase in a low-frequency cutoff during a period in which the pixel signal output from the amplifying transistor T12 of the pixel varies, and by decelerating the transient response speed with decrease in the low-frequency cutoff during a period in which the pixel signal output from the amplifying transistor T12 is stable.

Furthermore, in recent years, the fast reading operation of a pixel signal increases a clock frequency of an AD conversion unit or an serial output to 500 MHz to 1 GHz or higher. Since the clock noise represents square waves of a high frequency, it is easily superimposed on a pixel array provided on a semiconductor substrate, through the semiconductor substrate and power/GND, and causes deterioration in the noise characteristics. Here, since the clock noise after applying a low-pass filter is attenuated by 60 dB, for example, by setting the cutoff frequency fc approximately to 500 kHz that is not higher than 1/1000 times of the clock frequency when the bandwidth of the low-pass filter is narrowed, the noise tolerance can be increased for the digital noise. When the noise can be attenuated by 60 dB assuming that the clock noise superimposed on pixel units is several mV, qualitatively, the input level to the CDS unit is reduced to several tens of μV, and becomes almost tolerable.

Thus, the solid-state imaging device of the column-parallel-output type according to the present invention can include a low-pass filter for each column even with the limitation in pitch for the column area, and can maintain a balance between the fast reading operation and improving of the noise characteristics while suppressing increase in the chip area.

The present invention is not limited to Embodiments, and may be improved and modified in various ways without departing from the scope of the present invention.

Although for example, the vertical signal lines 19 are directly connected to the low-pass filters 300 (*a* to *e*), the column amplifier 53 in FIG. 10 may be provided between each of the vertical signal lines 19 and a corresponding one of the low-pass filters 300 (*a* to *e*). With the column amplifiers 53, the output voltage of the amplifying transistor T12 of each of the unit pixels 3 can be amplified, and improvement on a S/N ratio and switching gains become possible.

Furthermore, the solid-state imaging device 1 according to each of Embodiments has a structure including the counting unit 254 in each of the column processing units 26 as a AD conversion structure, and reads the reset component (Vrst) in a down-count mode and the data component (Vrst+Vsig) in an up-count mode. As long as it has the AD conversion structure for reading the reset component and the data component, the advantages of the present invention can be similarly obtained, and thus the structure is not limited to the one described above.

Furthermore, according to the present invention, the pixel array 10 having a one-pixel one-cell structure may obviously have a multiple-pixel one-cell structure.

Furthermore, although according to the present invention, the low-pass filters 300 (*a* to *h*) is a simple first-order RC filter including one resistor and one capacitor, it may be a high-order filter, such as a second-order filter when the attenuation characteristics needs to be steeper.

It is preferred that the cutoff frequency of the first filter characteristics is lower than 1/1000 times of the clock frequency of the AD conversion unit. Thus, a signal having the clock frequency is attenuated by 60 dB or more by switching from the second filter characteristics to the first filter characteristics. Here, since the clock noise after applying a low-pass filter is attenuated by 60 dB or more, the noise tolerance can be increased for the digital noise.

The solid-state imaging device according to the present invention is not limited to Embodiments described. Without departing from the scope of the present invention, the present invention includes an embodiment with some modifications on Embodiments that are conceived by a person skilled in the art, another embodiment obtained through combinations of the constituent elements and steps of different Embodiments in the present invention, and various devices each including the solid-state imaging device according to the present invention.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

As described above, the simple configuration with the smaller number of elements according to the present invention allows the fast reading operation and improving of the noise characteristics even with the limitation in pitch for the column area. The present invention is applicable to, for example, MOS solid-state imaging devices, digital still cameras, movie cameras, mobile phones equipped with cameras, and monitoring cameras.

The invention claimed is:

1. A solid-state imaging device that includes a plurality of unit pixels arranged in rows and columns and reads a pixel signal from the unit pixels selected for each of the rows, the solid-state imaging device comprising:
    column signal lines each provided for a corresponding one of the columns of the unit pixels;
    amplifying transistors each included in a corresponding one of the unit pixels and outputting the pixel signal;
    correlated double sampling units each provided for a corresponding one of the columns of the unit pixels and configured to perform correlated double sampling on a reset component of the pixel signal and on a data component including the reset component and a signal component of the pixel signal so as to sample the signal component;
    low-pass filters each (i) inserted in a corresponding one of the column signal lines between an output terminal of the amplifying transistor and the correlated double sampling unit or (ii) included in a corresponding one of the correlated double sampling units, and
    a reference signal generating unit configured to generate a reference signal having a ramp waveform,
    wherein each of the correlated double sampling units includes:
        a voltage comparator provided for a corresponding one of the columns; and
        a counter that counts a clock signal,
    the voltage comparator includes:
        a differential input unit including two transistors that receive the reference signal, and the pixel signal output from the amplifying transistor; and
        a load capacitor connected between output terminals of the differential input unit,
    the voltage comparator converts the pixel signal into a duration by comparing the pixel signal with the reference signal,
    the counter converts the duration into a digital signal, and
    the two transistors and the load capacitor function as the low-pass filter.

2. A solid-state imaging device that includes a plurality of unit pixels arranged in rows and columns and reads a pixel signal from the unit pixels selected for each of the rows, the solid-state imaging device comprising:
    column signal lines each provided for a corresponding one of the columns of the unit pixels;
    amplifying transistors each included in a corresponding one of the unit pixels and outputting the pixel signal;
    correlated double sampling units each provided for a corresponding one of the columns of the unit pixels and configured to perform correlated double sampling on a reset component of the pixel signal and on a data component including the reset component and a signal component of the pixel signal so as to sample the signal component; and
    low-pass filters each (i) inserted in a corresponding one of the column signal lines between an output terminal of the amplifying transistor and the correlated double sampling unit or (ii) included in a corresponding one of the correlated double sampling units;
    wherein each of the unit pixels includes:
        a photodiode that converts light into signal charges;
        a floating diffusion layer that holds the signal charges;
        a reset transistor that resets the signal charges held by the floating diffusion layer;
        a transfer transistor that transfers the signal charges from the photodiode to the floating diffusion layer; and
        the amplifying transistor that outputs the pixel signal according to the signal charges held by the floating diffusion layer,
    wherein each of the low-pass filters is switchable between first filter characteristics and second filter characteristics, the second filter characteristics including (i) a low-frequency cutoff higher than a low-frequency cutoff of the first filter characteristics and (ii) a transient response speed faster than a transient response speed of the first filter characteristics, and
    the low-pass filter is operated with the second filter characteristics during a period in which the pixel signal output from the amplifying transistor varies, and is operated with the first filter characteristics during a period in which the pixel signal is stable.

3. The solid-state imaging device according to claim 2, wherein the low-pass filter includes:
    a resistor inserted in the column signal line; and
    a capacitor connected between a ground line and a terminal of the resistor, the terminal being closer to the correlated double sampling unit.

4. The solid-state imaging device according to claim 3, wherein the low-pass filter further includes a first switch connected in parallel with the resistor.

5. The solid-state imaging device according to claim 3, wherein the low-pass filter further includes a first p-n junction element connected in parallel with the resistor, and a second p-n junction element connected in parallel with the resistor opposite in polarity to the first p-n junction element.

6. The solid-state imaging device according to claim 3, wherein the low-pass filter further includes an operational transconductance amplifier having a positive input terminal, a negative input terminal, and an output terminal, the positive input terminal being connected to the other terminal of the resistor that is closer to the amplifying transistor, and the negative input terminal and the output terminal being connected to the terminal of the resistor that is closer to the correlated double sampling unit.

7. The solid-state imaging device according to claim 1, wherein each of the low-pass filters includes:

a resistor inserted in a corresponding one of the column signal lines; and a capacitor connected between the column signal line and a ground line, the solid-state imaging device further comprises signal holding units each provided for the column signal line and configured to sample and hold an analog signal output from the column signal line, each of the signal holding units includes a second switch inserted in the column signal line between the resistor and the correlated double sampling unit, the capacitor is connected between the column signal line and the ground line, the column signal line being located between the second switch and the correlated double sampling unit, and the capacitor functions as a part of the low-pass filter with the second switch ON before the correlated double sampling unit performs the correlated double sampling, and functions as a part of the signal holding unit with the second switch OFF during the time when the correlated double sampling unit performs the correlated double sampling.

8. The solid-state imaging device according to claim 7, wherein the low-pass filter further includes a first switch connected in parallel with the resistor.

9. The solid-state imaging device according to claim 7, wherein the low-pass filter further includes a first switch having (i) a terminal connected to the column signal line of the resistor that is closer to the amplifying transistor, and (ii) the other terminal connected to the column signal line of the second switch that is closer to the correlated double sampling unit.

10. The solid-state imaging device according to claim 4, wherein the first switch is ON during the period in which the pixel signal output from the amplifying transistor varies, and is OFF during the period in which the pixel signal is stable.

11. The solid-state imaging device according to claim 4, wherein the first switch is ON during a first period including a period during which the reset transistor performs a reset operation, and is turned OFF after the first period, and the first switch is ON during a second period including a period during which the transfer transistor performs a transfer operation, and is turned OFF after the second period.

12. The solid-state imaging device according to claim 1, wherein a cutoff frequency of the low-pass filter is lower than half a frequency for reading the reset component and the data component on both of which the correlated double sampling is performed.

13. The solid-state imaging device according to claim 2, wherein a cutoff frequency of the first filter characteristics is lower than half a frequency for reading the reset component and the data component on both of which the correlated double sampling is performed.

14. The solid-state imaging device according to claim 2, wherein a cutoff frequency of the first filter characteristics is lower than 1/1000 times of a clock frequency of the correlated double sampling unit, and a signal having the clock frequency is attenuated by 60 dB or more by switching from the second filter characteristics to the first filter characteristics.

15. The solid-state imaging device according to claim 3, wherein the resistor includes a MOS transistor.

16. The solid-state imaging device according to claim 6, wherein the operational transconductance amplifier includes a MOS transistor.

17. A camera comprising the solid-state imaging device according to claim 1.

18. A method for driving a solid-state imaging device that includes a plurality of unit pixels arranged in rows and columns and reads a pixel signal from the unit pixels selected for each of the rows, the solid-state imaging device including: column signal lines each provided for a corresponding one of the columns of the unit pixels; amplifying transistors each included in a corresponding one of the unit pixels and outputting the pixel signal; correlated double sampling units each provided for a corresponding one of the columns of the unit pixels and configured to perform correlated double sampling on a reset component of the pixel signal and on a data component including the reset component and a signal component of the pixel signal so as to sample the signal component; and low-pass filters each (i) inserted in a corresponding one of the column signal lines between an output terminal of the amplifying transistor and the correlated double sampling unit or (ii) included in a corresponding one of the correlated double sampling units, each of the low-pass filters being switchable between first filter characteristics and second filter characteristics, the second filter characteristics including (i) a low-frequency cutoff higher than a low-frequency cutoff of the first filter characteristics and (ii) a transient response speed faster than a transient response speed of the first filter characteristics, and the driving method comprising:

operating each of the low-pass filters with the second filter characteristics during a period in which the pixel signal output from the amplifying transistor varies; and operating each of the low-pass filters with the first filter characteristics during a period in which the pixel signal is stable.

* * * * *